(12) United States Patent
Kobayashi et al.

(10) Patent No.: US 8,566,611 B2
(45) Date of Patent: Oct. 22, 2013

(54) ELECTRONIC DEVICE, UNLOCKING METHOD, AND PROGRAM

(75) Inventors: Yutaka Kobayashi, Tokyo (JP); Kazuya Fujimura, Kanagawa (JP); Osamu Uchida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 320 days.

(21) Appl. No.: 12/675,211

(22) PCT Filed: Aug. 28, 2007

(86) PCT No.: PCT/JP2007/066687
§ 371 (c)(1),
(2), (4) Date: Feb. 25, 2010

(87) PCT Pub. No.: WO2009/028052
PCT Pub. Date: Mar. 5, 2009

(65) Prior Publication Data
US 2010/0251358 A1    Sep. 30, 2010

(51) Int. Cl.
*G06F 21/72* (2013.01)
*G06F 21/31* (2013.01)
(52) U.S. Cl.
USPC .................................. 713/189; 726/19
(58) Field of Classification Search
USPC ................. 713/189, 193–194; 726/18–19
See application file for complete search history.

(56) References Cited

U.S. PATENT DOCUMENTS

| | | | |
|---|---|---|---|
| 4,812,841 A * | 3/1989 | Chen ............................ | 340/5.27 |
| 5,282,247 A | 1/1994 | McLean et al. | |
| 6,182,225 B1 | 1/2001 | Hagiuda et al. | |
| 6,273,335 B1 * | 8/2001 | Sloan ............................ | 235/382 |
| 6,615,171 B1 * | 9/2003 | Kanevsky et al. ............. | 704/246 |
| 6,615,623 B1 * | 9/2003 | Ormerod ........................ | 70/224 |
| 2001/0040183 A1 | 11/2001 | Niwata et al. | |
| 2003/0046593 A1 * | 3/2003 | Xie et al. ....................... | 713/202 |

(Continued)

FOREIGN PATENT DOCUMENTS

| | | |
|---|---|---|
| JP | 63-286953 A | 11/1988 |
| JP | 3-40165 A | 2/1991 |

(Continued)

OTHER PUBLICATIONS

International Search Report for PCT/JP2007/066687.

*Primary Examiner* — Eleni Shiferaw
*Assistant Examiner* — Abu Sholeman
(74) *Attorney, Agent, or Firm* — Pearne & Gordon LLP

(57) ABSTRACT

There is provided an electronic device capable of automatically unlocking a lock of an external storage device using a password without adding a function to the external storage device. An electronic device 100 includes a memory card connection unit 108 connecting a memory card 200 capable of being locked using the password, a password retention unit 101 retaining the password of the memory card 200, a lock state determination unit 106 determining whether or not the memory card 200 connected to the memory card connection unit 108 is in a locked state, and a setting cancellation unit 105 transmitting an unlocking signal for unlocking the locked state of the memory card 200 on the basis of the password when it is determined that the memory card 200 is in the locked state.

27 Claims, 17 Drawing Sheets

(56) References Cited

U.S. PATENT DOCUMENTS

| | | | |
|---|---|---|---|
| 2003/0097580 A1* | 5/2003 | Chang | 713/194 |
| 2004/0215910 A1* | 10/2004 | Okaue et al. | 711/164 |
| 2004/0243779 A1* | 12/2004 | Okaue et al. | 711/166 |
| 2006/0041761 A1* | 2/2006 | Neumann et al. | 713/189 |
| 2006/0080562 A1 | 4/2006 | Ooshima et al. | |
| 2006/0156035 A1* | 7/2006 | Tran et al. | 713/193 |
| 2006/0264240 A1 | 11/2006 | Arai | |
| 2007/0174618 A1* | 7/2007 | Nakano et al. | 713/171 |
| 2008/0268906 A1* | 10/2008 | Ohmoto | 455/558 |
| 2010/0049993 A1* | 2/2010 | Okaue et al. | 713/193 |
| 2011/0010517 A1* | 1/2011 | Fujimura et al. | 711/164 |

FOREIGN PATENT DOCUMENTS

| | | |
|---|---|---|
| JP | 7-114501 A | 5/1995 |
| JP | 8-505964 A | 6/1996 |
| JP | 10-293664 A | 11/1998 |
| JP | 10-334197 A | 12/1998 |
| JP | 11-031255 A | 2/1999 |
| JP | 2000-113119 A | 4/2000 |
| JP | 2001-306513 A | 11/2001 |
| JP | 2004-259208 A | 9/2004 |
| JP | 2006-99649 A | 4/2006 |
| JP | 2006-319438 A | 11/2006 |
| JP | 2007-257218 A | 10/2007 |

* cited by examiner

FIG. 14
(a)
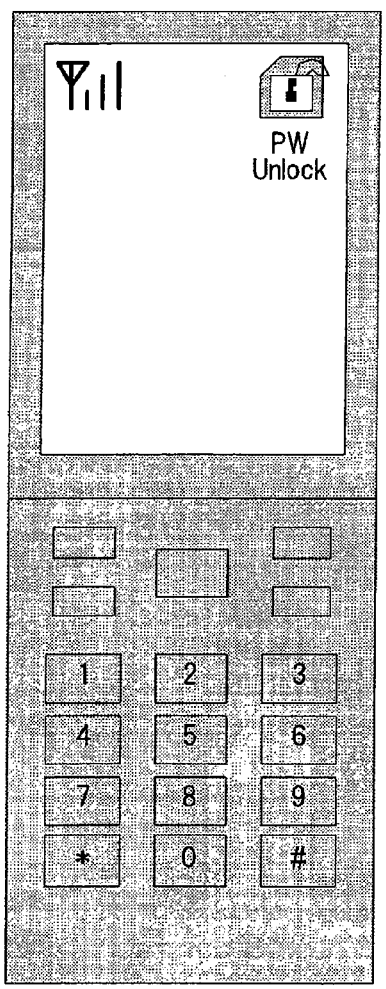
(b)
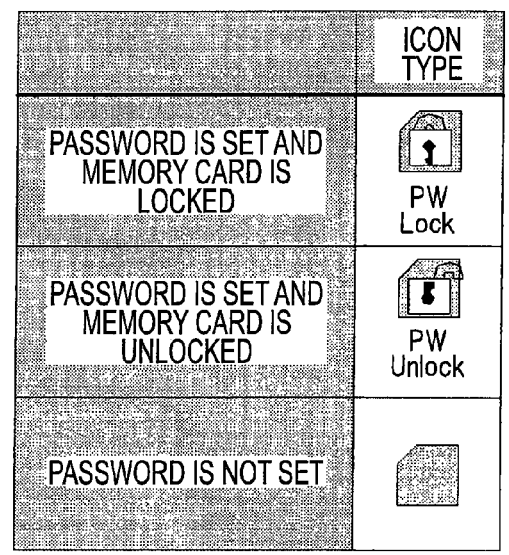

ELECTRONIC DEVICE, UNLOCKING METHOD, AND PROGRAM

TECHNICAL FIELD

The present invention relates to an electronic device, an unlocking method, a password setting method, a password erasing method, and a program, and particularly relates to an electronic device to which an external storage medium capable of being locked using a password is connected, an unlocking method of the password, and a program for unlocking a lock using the password.

BACKGROUND ART

Conventionally, it is possible to easily carry various information by using a memory card such as an SD card or the like. By connecting the memory card to an electronic device, it is possible to import various information stored in the memory card into the electronic device and perform processing in the electronic device.

Recently, with an increase in the capacity of the memory card, personal information or secret information is increasingly stored in the memory card. In addition, with enhanced awareness of security of a user using the memory card, a memory card requiring an input of a password in order to refer to information in the memory card is already present.

For example, there is known a computer system having a memory card for storing data which can be reinserted even after being detached and has a function of protecting stored data. In the computer system, it is possible to perform a password lock using a Lock_Unlock command.

However, in this computer system, in the use of the memory card protected using the password, the password needs to be inputted every time the memory card is connected to the electronic device such through insertion or the like, or every time the power of the memory card is turned on so that a burden on the user is increased.

As an example of a method which does not require the input of the password every time, there is known a method in which, when a user card number and its personal identification number are inputted into one transaction terminal in a game hall, the information is stored in a central control device, and other transaction terminals connected to a central processing device are usable within a predetermined exemption time period without the input of the personal identification number (see, e.g., Patent Document 1).

In addition, there is known a system in which a Web site provider temporarily writes data into a computer of a visitor through a Web browser to store the data. The system is called a cookie system, and it is possible to record information related to a user, the date and time of the final visit to the site, the number of visits to the site, authentication information, and the like in the cookie. Consequently, when this system is used for the authentication of the memory card, the input of the password is required only once when the memory card is connected to the electronic device for the first time and, thereafter, the input of the password is no longer necessary.

Further, there is known a program which causes a computer to execute storage of input information such as an ID, a password, and the like inputted in an input screen in a database and an automatic input of the recorded input information every time the input screen is opened (see, e.g., Patent Document 2).
Patent Document 1: JP-B-3335877
Patent Document 2: JP-A-2004-259208

DISCLOSURE OF THE INVENTION

Problem to be Solved by the Invention

However, in the method of Patent Document 1, for example, when the memory card is locked as in a case where the predetermined exemption time period for the input of the password is exceeded, where the memory card is reinserted, or where the power of the memory card is turned on once again, the user has to repeatedly input the password in the memory card.

In addition, in the cookie system described above, since a function of generating and transmitting the cookie has to be added to the memory card side, it is necessary to redesign the memory card, which is not preferable in order to implement a reduction in the size of the memory card.

Further, in the program of Patent Document 2, the use of the Web browser is presupposed, and the input screen is displayed for the case where a plurality of accounts for getting access to a specific site are present. Accordingly, the user has to perform some operation with respect to the input screen so that the burden on the user is increased and the operation becomes complicated. Furthermore, in order to get access to the specific site, a client (user) has to specify a URL as identification information for identifying the site so that the burden on the user is increased and the operation becomes complicated.

The present invention has been achieved in view of the above-mentioned circumstances, and an object of the present invention is to provide an electronic device, an locking method, and a program which are capable of automatically unlocking a lock of an external storage device using a password without adding a function to the external storage device.

Means for Solving Problem

In order to achieve the above object, an electronic device according to a first aspect of the present invention includes: an external storage device connection part connecting an external storage device capable of being locked by a password; a password retention part retaining the password of the external storage device; a lock state determination part determining whether or not the external storage device connected to the external storage device connection part is in a locked state; and an unlocking part transmitting an unlocking signal for unlocking the locked state of the external storage device on a basis of the password when the lock state determination part determines that the external storage device is in the locked state.

With this configuration, it is possible to automatically unlock a lock of the external storage device by the password without adding a function to the external storage device.

The electronic device according to a second aspect of the present invention is configured by further including an identification information acquisition part acquiring identification information for identifying the external storage device, wherein the password retention part retains the identification information on the external storage device and the password in association with each other, and the unlocking part transmits the unlocking signal on the basis of the password associated with the identification information when identification information identical with the identification information acquired by the identification information acquisition part is retained in the password retention part.

With this configuration, it is possible to attempt to perform unlocking with the obtained identification information and the retained password, and is possible to unlock the lock using the password without performing the input by a key operation or the like.

The electronic device according to a third aspect of the present invention is configured in that, when the unlocking part fails in unlocking after the transmission of the unlocking signal, the unlocking part retransmits the unlocking signal on the basis of a password inputted by an input part.

With this configuration, even when the unlocking has failed once, it becomes possible to perform the unlocking with the inputted password. For example, even when the password of the external storage device has been changed by another electronic device, it becomes possible to perform the unlocking.

The electronic device according to a fourth aspect of the present invention is configured in that, when the unlocking part succeeds in unlocking after the retransmission of the unlocking signal, the unlocking part stores the identification information acquired by the identification information acquisition part and the password inputted by the input part in the password retention part in association with each other.

With this configuration, since the obtained identification information and the inputted password are stored in association with each other, it becomes possible to automatically unlock the lock using the password when the lock is unlocked after the storage.

The electronic device according to a fifth aspect of the present invention is configured in that, when the unlocking part fails in unlocking after the transmission of the unlocking signal on the basis of the password retained in the password retention part, the unlocking part transmits the unlocking signal on the basis of another password retained in the password retention part.

With this configuration, even when the identification information on the external storage device is not provided in the password retention part, it becomes possible to attempt to perform the unlocking by sequentially retrieving the password.

The electronic device according to a sixth aspect of the present invention is configured by further including a password setting part transmitting a password setting signal for setting the password to the external storage device.

With this configuration, for example, when the password is not added to the external storage device, it becomes possible to set the password in the external storage device.

The electronic device according to a seventh aspect of the present invention is configured in that the password setting part transmits the password setting signal for setting the password inputted by the input part.

With this configuration, it becomes possible to set the password using the input by the key operation of the user or the like.

The electronic device according to an eighth aspect of the present invention is configured by further including a password mode setting part setting a password mode for setting or erasing the password, wherein when a password setting mode is set as the password mode, the password setting part transmits the password setting signal on the basis of the password associated with the identification information acquired by the identification information acquisition part.

With this configuration, in the case of the password setting mode, it becomes possible to automatically set the password without performing the input by the key operation or the like. For example, when the password setting or unlocking has been performed once by the electronic device of concern and, thereafter, the password is erased, it becomes possible to automatically perform the password setting by using the password retained in the password retention part only by setting the password setting mode.

The electronic device according to a ninth aspect of the present invention is configured by further including a password erasing part transmitting a password erasing signal for erasing the password on the basis of the password associated with the identification information acquired by the identification information acquisition part when a password erasing mode is set as the password mode.

With this configuration, in the case of the password erasing mode, it becomes possible to automatically erase the password without performing the input by the key operation or the like.

The electronic device according to a tenth aspect of the present invention is configured by further including a main body lock mode setting part setting a main body lock mode for locking or unlocking a function provided in the electronic device, wherein when a locking mode is set as the main body lock mode, the password mode setting part sets the password setting mode as the password mode.

With this configuration, only by setting the main body locking mode, it becomes possible to automatically perform the password setting in conjunction with the main body locking mode.

The electronic device according to an eleventh aspect of the present invention is configured in that, when an unlocking mode is set as the main body lock mode, the password mode setting part sets the password erasing mode as the password mode.

With this configuration, only by setting the main body unlocking mode, it becomes possible to automatically perform the password erasing in conjunction with the main body unlocking mode.

The electronic device according to a twelfth aspect of the present invention is configured in that the password setting part stores the set password in the password retention part.

With this configuration, after the password setting, it becomes possible to automatically unlock the lock using the password only by connecting the external storage device to the electronic device of concern.

The electronic device according to a thirteenth aspect of the present invention is configured in that the password is a password for locking or unlocking the function provided in the electronic device.

With this configuration, since the main body locking password and the password of the external storage device become the same password, it becomes possible to reduce the number of passwords which the user is required to memorize.

The electronic device according to a fourteenth aspect of the present invention is configured in that the password is based on IC identification information for identifying an IC card connected to the electronic device.

With this configuration, it becomes possible to reduce the number of passwords which the user is required to memorize. In addition, it is possible to perform the password setting without performing the input by the key operation or the like.

The electronic device according to a fifteenth aspect of the present invention is configured by further including a password generation part generating the password.

With this configuration, the password can be set without performing the input by the key operation or the like. In addition, by performing the password generation by using random numbers or time, or performing the conversion or encryption of the identification information on the IC card, the password with high security is obtained.

The electronic device according to a sixteenth aspect of the present invention is configured in that the password generation part generates the password on the basis of the identification information for identifying the external storage device and identification information for identifying an IC card connected to the electronic device.

With this configuration, the password can be set without performing the input by the key operation or the like, and the password with high security is obtained.

The electronic device according to a seventeenth aspect of the present invention is configured by further including: a data access part for getting access to data of the external storage device; and a power supply part supplying power to the external storage device during a time period when the access is performed by the data access part, wherein when the power is supplied by the power supply part, the unlocking part transmits the unlocking signal.

With this configuration, for example, when a power saving setting is made in order to implement power saving, it becomes possible to unlock the lock using the password in response to the power saving setting. In this case, for example, when the access is made to the external storage device, the lock using the password is unlocked by performing the power supply. When the access is not made to the external storage device for a predetermined time period, the power saving is implemented by not performing the power supply, and it becomes possible to automatically perform the unlocking every time the power supply is resumed.

The electronic device according to an eighteenth aspect of the present invention is configured by further including an IC card connection part connecting the IC card having the password retention part, wherein when data reference or data storage is performed to the password retention part of the IC card, the unlocking part or the identification information acquisition part makes an access request to the IC card.

With this configuration, it becomes possible to store the password and the identification information on the card in the storage part in the IC card and, by connecting the IC card retaining the password to another electronic device, it becomes possible to carry out the password setting and the unlocking in the another electronic device only by connecting the external storage device to the another electronic device.

The electronic device according to a nineteenth aspect of the present invention is configured in that the IC card is a SIM card.

With this configuration, it becomes possible to carry out the effective password setting and unlocking each utilizing the SIM card.

The electronic device according to a twentieth aspect of the present invention is configured by further including a display part performing a display for reporting at least one of a password setting state in the external storage device and a lock setting state of the external storage device.

With this configuration, it becomes possible to recognize whether or not the password is set in the external storage device and whether or not the external storage device is in the locked state at a glance. Accordingly, for example, it is possible to discern whether an unlocked state is caused simply because the password is not set or the unlocked state is automatically caused after the locked state because the password is set.

The electronic device according to a twenty-first aspect of the present invention is configured in that, when the password is set in the external storage device and the external storage device is in the locked state, the display part displays that the password is set in the external storage device and the external storage device is in the locked state.

With this configuration, it is possible to instantly determine that the password is already set and the external storage device is locked.

The electronic device according to a twenty-second aspect of the present invention is configured in that, when the password is set in the external storage device and the external storage device is in an unlocked state, the display part displays that the password is set in the external storage device and the external storage device is in the unlocked state.

With this configuration, it is possible to instantly determine that the external storage device is not in a state where the external storage device is not locked because the password is not set, but in a state where the password is set and the external storage device is unlocked.

The electronic device according to a twenty-third aspect of the present invention is configured in that, when the password is not set in the external storage device, the display part displays that the password is not set in the external storage device.

With this configuration, it is possible to instantly determine that the external storage device is not in the state where the password is set and the external storage device is unlocked, but in the state where the external storage device is not locked because the password is not set.

The electronic device according to a twenty-fourth aspect of the present invention is configured in that the unlocking signal includes the password.

With this configuration, the external storage device can perform the unlocking.

The electronic device according to a twenty-fifth aspect of the present invention is configured in that the password setting signal includes the password.

With this configuration, the external storage device can perform the password setting.

The electronic device according to a twenty-sixth aspect of the present invention is configured in that the password erasing signal includes the password.

With this configuration, the external storage device can perform the password erasing.

The electronic device according to a twenty-seventh aspect of the present invention is configured in that, when the password setting mode is set as the password mode, and when the identification information acquired by the identification information acquisition part is not retained in the password retention part, the password setting part transmits the password setting signal on the basis of the password inputted by the input part.

With this configuration, in the case of the password setting mode, it becomes possible to reliably set the password in the memory card in which the password is not set.

The electronic device according to a twenty-eighth aspect of the present invention is configured in that, when the external storage device is brought into the locked state on the basis of the power supply to the external storage device, the lock state determination part determines that the password is set in the external storage device and the external storage device is in the locked state.

With this configuration, it becomes possible to display a lock icon.

The electronic device according to a twenty-ninth aspect of the present invention is configured in that, when the external storage device is brought into the locked state on the basis of the power supply to the external storage device and the unlocking of the locked state is successfully performed using the unlocking signal, the lock state determination part determines that the password is set in the external storage device and the external storage device is in the unlocked state.

With this configuration, it becomes possible to display an unlock icon.

The electronic device according to a thirtieth aspect of the present invention is configured in that, when the external storage device is not brought into the locked state on the basis of the power supply to the external storage device, the lock state determination part determines that the password is not set in the external storage device.

With this configuration, it becomes possible to display a password unset icon.

An unlocking method of a first aspect of the present invention includes, in an electronic device, the steps of: determining whether or not an external storage device is in a locked state; and transmitting an unlocking signal for unlocking the locked state of the external storage device on a basis of a password retained in a password retention part retaining the password of the external storage device when it is determined that the external storage device connected to an external storage device connection part connecting the external storage device capable of being locked using the password is in the locked state.

With this method, it is possible to automatically unlock the lock of the external storage device using the password without adding the function to the external storage device.

A program of a first aspect of the present invention is a program for causing a computer to execute the individual steps of the unlocking method.

With this program, it is possible to automatically unlock the lock of the external storage device using the password without adding the function to the external storage device.

Advantageous Effect of the Invention

According to the present invention, there can be provided an electronic device, an unlocking method, and a program which are capable of automatically unlocking a lock of an external storage device using a password without adding a function to the external storage device.

BRIEF DESCRIPTION OF THE DRAWINGS

FIG. 14 is a view showing an example of an electronic device performing a display in a ninth embodiment of the present invention and examples of icons displayed by a display part of the electronic device;

Figure 1:
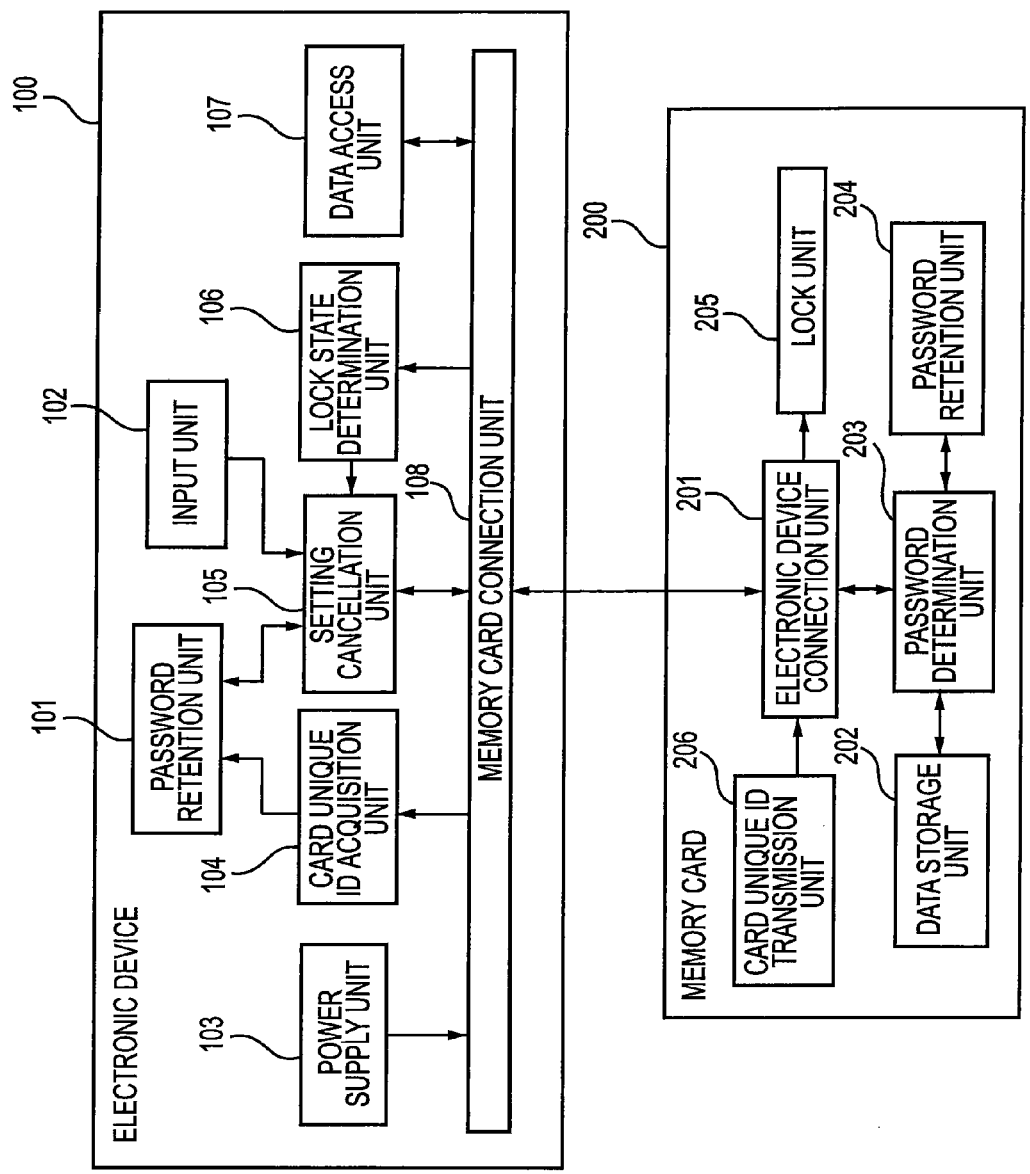
FIG. 1 is a view showing an example of a schematic configuration of an electronic device in a first embodiment of the present invention.

EXPLANATIONS OF REFERENCE NUMERALS AND SIGNS 100 electronic device
101 password retention unit
102 input unit
103 power supply unit
104 card unique ID acquisition unit
105 setting cancellation unit
106 lock state determination unit
107 data access unit
108 memory card connection unit
109 power control unit
110 password mode setting unit
111 password erasing unit
112 IC card connection unit
113 main body lock unit
114 IC unique ID conversion unit
115 password generation unit
116 main body lock mode setting unit
117 display part
200 memory card
201 electronic device connection unit
202 data storage unit
203 password determination unit
204 password retention unit
205 lock unit
206 card unique ID transmission unit
300 IC card
301 password retention unit

BEST MODE FOR CARRYING OUT THE INVENTION

A description will be given hereinbelow to an electronic device, an unlocking method, and a program in embodiments of the present invention by using the drawings.

First Embodiment

FIG. 1 is a view showing one example of schematic configurations of an electronic device 100 and a memory card 200 in a first embodiment of the present invention.

The electronic device 100 includes a password retention unit 101, an input unit 102, a power supply unit 103, a card unique ID acquisition unit 104, a setting cancellation unit 105, a lock state determination unit 106, a data access unit 107, and a memory card connection unit 108. As the electronic device 100, there can be considered a PC, a PDA, a portable telephone terminal, a television, a digital still camera, a digital video camera, an IC recorder, a printer, an AV player, an AV recorder, an HDD portable storage, a car navigation terminal, and other electronic devices each to which an external storage device such as the memory card 200 or the like can be connected.

It is to be noted that the memory card connection unit 108 is an example of "an external storage device connection part". In addition, the setting cancellation unit 105 has functions as "an unlocking part" and "a password setting part". Further, the card unique ID acquisition unit 104 has a function as "an identification information acquisition part".

The memory card 200 includes an electronic device connection unit 201, a data storage unit 202, a password determination unit 203, a password retention unit 204, a lock unit 205, and a card unique ID transmission unit 206. The memory card 200 will be described herein as an example of the external storage device. Alternatively, as the external storage device, there can be considered storage devices such as, e.g., a disk medium such as a hard disk, a DVD, or the like, and a semiconductor memory device such as an SSD (Solid State Drive), a USB memory, or the like. In addition, as the memory card 200, there can be considered an SD (Secure Digital) card, an MMC (Multi Media Card), a memory stick, an xD-picture card, a Compact Flash (registered trademark), and a SmartMedia.

Figure 2:
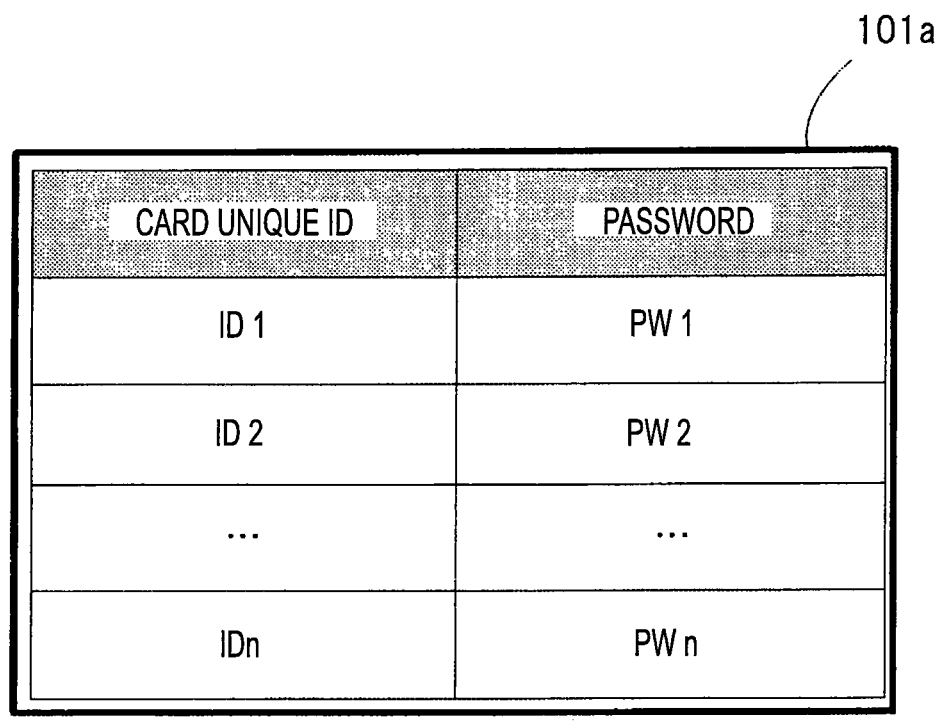
FIG. 2 is a view showing an example of a password retention table in the first embodiment of the present invention.

The password retention unit 101 retains a password set by the setting cancellation unit 105. For example, the password retention unit 101 has a password retention table 101a. In the password retention table 101a, a card unique ID for identifying the memory card 200 and the password of the card are stored in association with each other (paired up with each other). FIG. 2 is an example of the password retention table 101a.

The card unique ID is normally allocated to each memory card 200. However, for example, when the memory card 200 has a plurality of partitions, it is also possible to set the card unique ID and the password for each partition. Also in this case, it is possible to have one card unique ID and set a different password for each partition. With this arrangement, it is possible to bring each partition into a locked state or an unlocked state.

In addition, only the password may be stored in the password retention table 101a without storing the card unique ID therein. In this case, the password associated with the card unique ID is not acquired, but the passwords are referred to in ascending order in the password retention table 101a, and the password meeting predetermined conditions is acquired.

The input unit 102 is a unit for inputting text, an image, and sound. There can be considered, e.g., an input key, a camera, a microphone, and the like as the input unit 102. The input unit 102 inputs the password or the like.

The power supply unit 103 supplies power to the memory card 200 via the memory card connection unit 108.

The card unique ID acquisition unit 104 acquires the card unique ID transmitted from the memory card 200 via the memory card connection unit 108, and stores the card unique ID in the password retention unit 101.

The setting cancellation unit 105 stores the password inputted by the input unit 102 in the password retention unit 101. In addition, the setting cancellation unit 105 transmits a password setting signal for setting the password to the memory card 200 via the memory card connection unit 108. The password setting signal includes the password and a control signal from the input unit 102 or the password retention unit 101.

Further, the setting cancellation unit 105 transmits an unlocking signal for unlocking the locked state of the memory card 200 to the memory card 200 via the memory card connection unit 108. The unlocking signal includes the password and the control signal from the password retention unit 101 or the input unit 102.

The lock state determination unit 106 determines whether or not the memory card 200 is in the locked state using the password. For example, the lock state determination unit 106 acquires a locked state signal from the memory card 200 via the memory card connection unit 108 to determine whether or not the memory card 200 is in the locked state. In addition, the lock state determination unit 106 determines whether or not the password is set in the memory card 200.

The data access unit 107 transmits an access signal for performing read processing and write processing with respect to data stored in the data storage unit 202 of the memory card 200 to the memory card 200 via the memory card connection unit 108.

The memory card connection unit 108 is a unit for connecting the memory card 200, and is, e.g., a connection terminal. For example, the memory card is inserted into a memory card slot, and the memory card connection unit 108 and the electronic device connection unit 201 are connected to each other, whereby it becomes possible to perform a data exchange. In addition, the memory card connection unit 108 has a function for detecting the connection such as the insertion of the memory card 200 or the like.

The electronic device connection unit 201 is a unit for the connection to the electronic device 100, and is, e.g., the connection terminal. For example, the memory card 200 is inserted into the memory card slot, and the memory card connection unit 108 of the electronic device 100 and the electronic device connection unit 201 are connected to each other, whereby it becomes possible to perform the data exchange.

The data storage unit 202 stores various data.

The password determination unit 203 determines whether or not the password included in the unlocking signal and the password retained in the password retention unit 204 are identical with each other. In addition, when acquiring the password setting signal via the electronic device connection unit 201, the password determination unit 203 stores the password included in the password setting signal in the password retention unit 204.

The password retention unit 204 retains the password of the memory card 200.

When power is supplied to the memory card 200, the lock unit 205 performs locking for prohibiting access to the data storage part 202 to bring the memory card 200 into the locked state. In addition, when it is determined that target passwords to be determined are identical with each other by the password determination unit 203, the lock unit 205 performs unlocking for unlocking the locked state.

In addition, when the lock unit 205 performs locking, the lock unit 205 transmits the locked state signal indicative of the locked state to the electronic device 100 via the electronic device connection unit 201. Further, when the lock unit 205 performs unlocking, the lock unit 205 transmits an unlocking completion signal indicative of the completion of unlocking to the electronic device 100 via the electronic device connection unit 201. Furthermore, when the lock unit 205 fails in unlocking, the lock unit 205 may also be adapted to transmit an unlocking error signal indicative of the failure of unlocking to the electronic device 100 via the electronic device connection unit 201.

The card unique ID transmission unit 206 transmits the card unique ID to the electronic device 100 via the electronic device connection unit 201.

Figure 3:
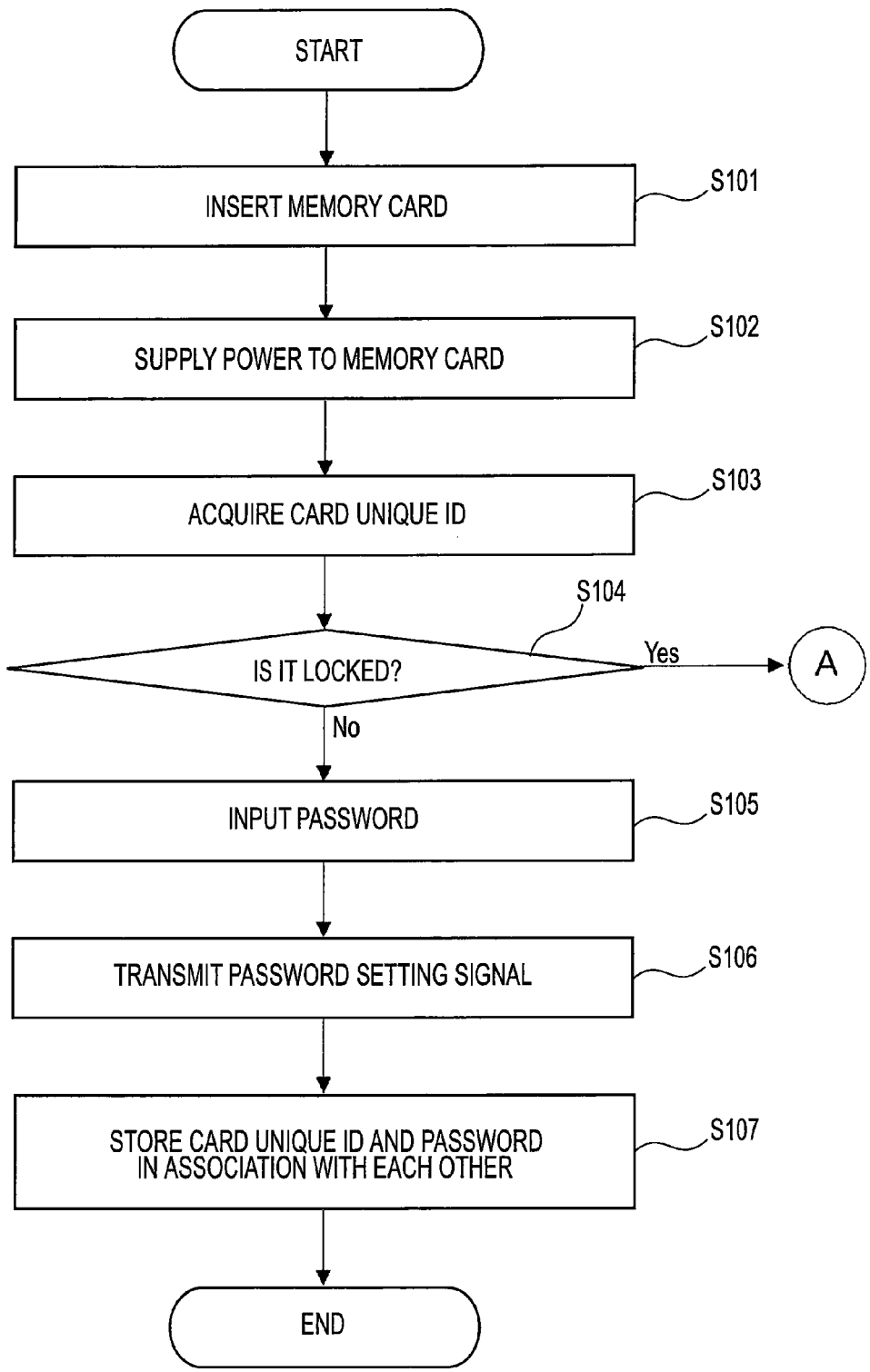
FIG. 3 is a flow chart showing an example of operations of the electronic device in the first embodiment of the present invention.
Figure 4:
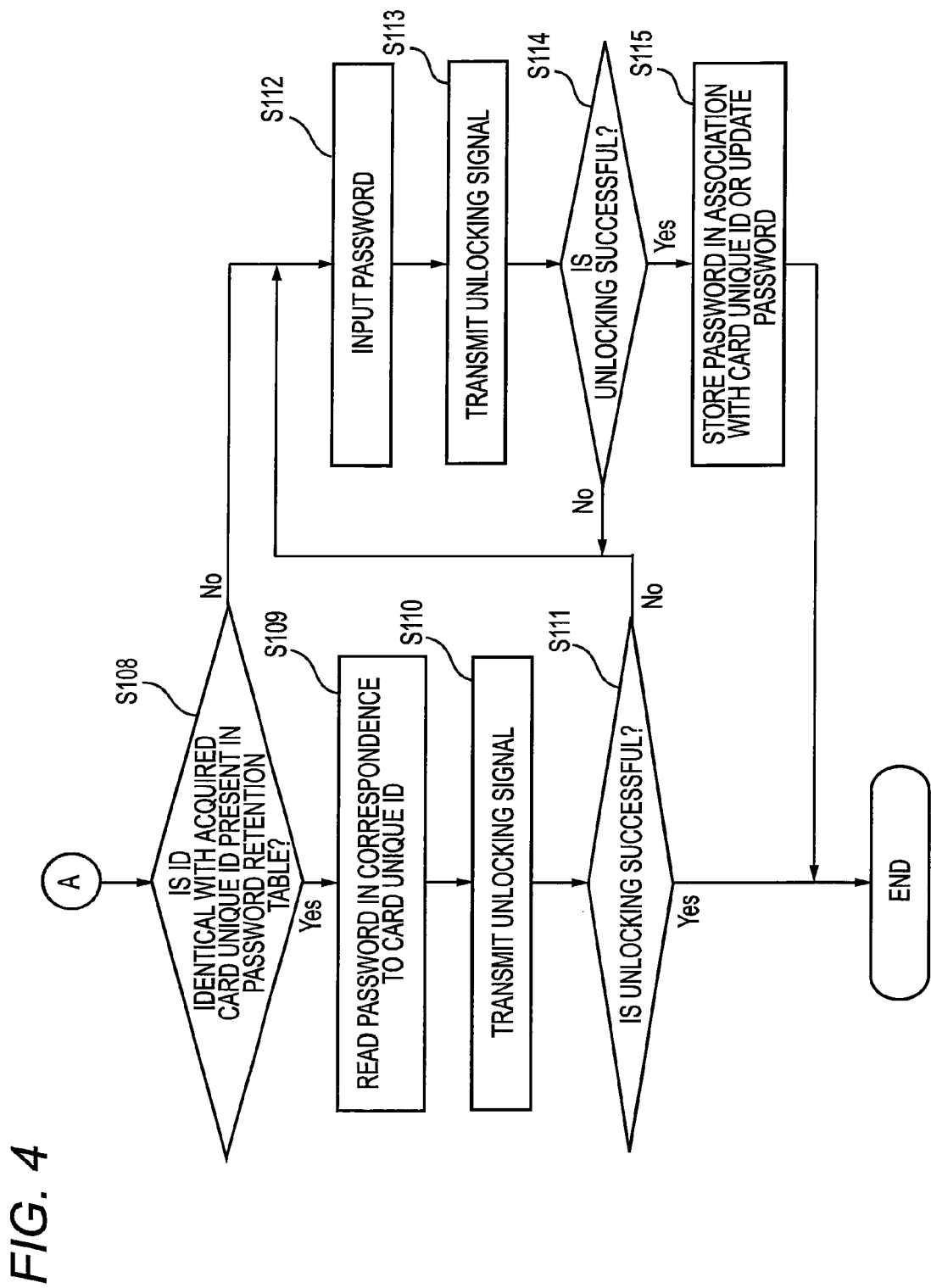
FIG. 4 is a flow chart showing an example of the operations of the electronic device in the first embodiment of the present invention.

Next, a description will be given to an example of operations of the electronic device 100. FIGS. 3 and 4 are flow charts each showing the example of the operations of the electronic device 100.

When the memory card connection unit 108 detects the connection such as the insertion of the memory card 200 into the memory card slot (step S101), the power supply unit 103 supplies power to the memory card 200 (step S102).

Subsequently, the card unique ID acquisition unit 104 acquires the card unique ID from the memory card 200 (step S103).

Then, the lock state determination unit 106 determines whether or not the memory card 200 is in the locked state (step S104). In this determination, for example, the lock state determination unit 106 acquires the locked state signal from the memory card 200 to determine whether or not the memory card 200 is in the locked state.

It is to be noted that the step S103 and the step S104 are in no particular order.

Figure 15:
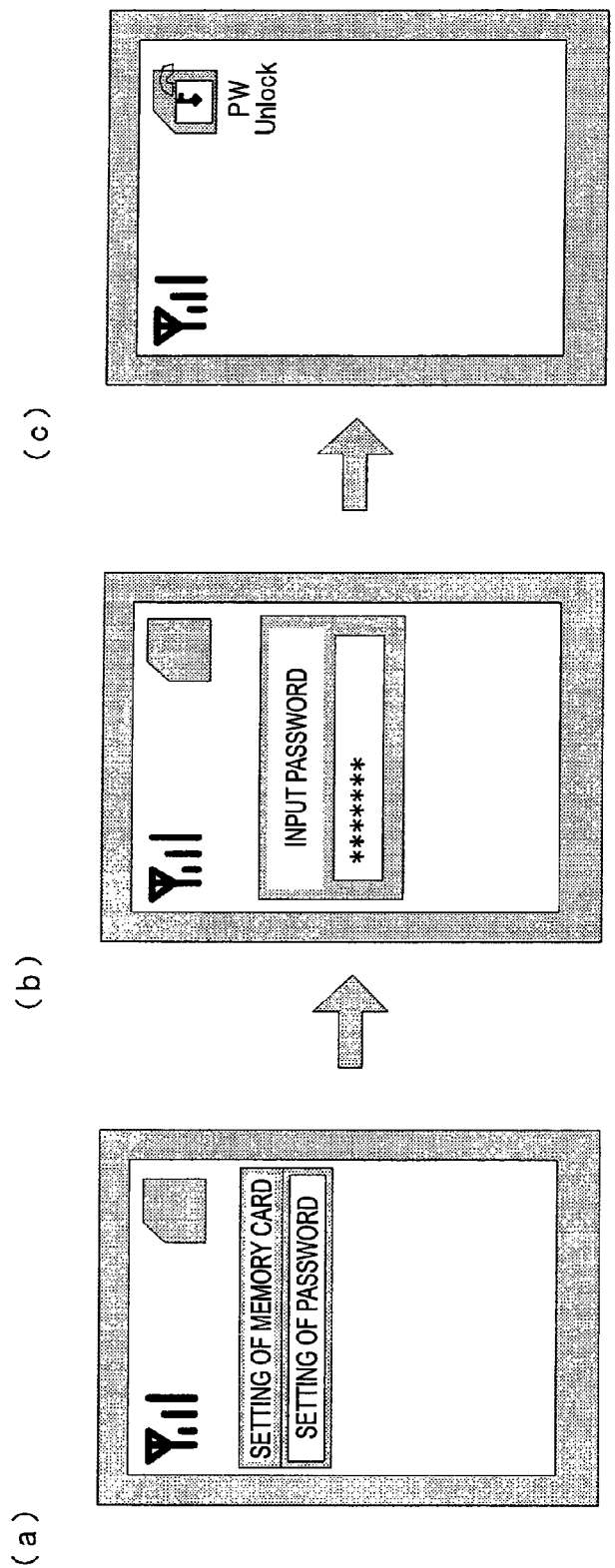
FIG. 15 shows examples of screen displays by the display part of the electronic device in the ninth embodiment of the present invention.

When it is determined that the memory card 200 is not in the locked state, the electronic device 100 is in a state where it can get access to the memory card 200. In this state, various settings can be made for the memory card 200 by the instruction of a user. For example, when the user sets the password in the memory card 200, as shown in FIG. 15 described later, a setting mode for performing the password setting is selected, and the input unit 102 inputs the password by the instruction of the user (step S105).

Subsequently, the setting cancellation unit 105 transmits the password setting signal in order to set the inputted password in the memory card 200 (step S106).

Then, the setting cancellation unit 105 stores the acquired card unique ID and the inputted password in the password retention unit 101 in association with each other (step S107). This completes the password setting.

In the step S104, when it is determined that the memory card 200 is in the locked state, the setting cancellation part 105 refers to the password retention table 101a retained in the password retention unit 101, and determines whether or not the card unique ID identical with the acquired card unique ID is present (step S108).

When the identical card unique ID is present, the setting cancellation unit 105 reads the password recorded in association with (paired up with) the card unique ID of concern from the password retention unit 101 (step S109).

For example, in FIG. 2, when the card unique ID is "ID 1", the setting cancellation unit 105 reads the password "PW 1".

Next, the setting cancellation unit 105 transmits the unlocking signal including the read password (step S110).

Subsequently, the lock state determination unit 106 determines whether or not the unlocking is successful (step S111). In this determination, for example, the unlocking may be determined to be successful when the unlocking completion signal is detected within a predetermined time period since the transmission of the unlocking signal, and the unlocking may also be determined to be unsuccessful when the unlocking error signal is detected.

When the unlocking is successful, the processing of the unlocking is ended. When the unlocking is unsuccessful, the operational flow advances to the part of the flow immediately before the step S112.

When the identical card unique ID is not present in the step S108, or when the unlocking is unsuccessful in the step S111, the input unit 102 inputs the password by the instruction of the user (step S112).

Subsequently, the setting cancellation unit 105 transmits the unlocking signal including the inputted password (step S113).

Next, the lock state determination unit 106 determines whether or not the unlocking is successful (step S114). In this determination, for example, the unlocking may be determined to be successful when the unlocking completion signal is detected within the predetermined time period since the transmission of the unlocking signal, and the unlocking may also be determined to be unsuccessful when the unlocking error signal is detected. When the unlocking is unsuccessful, the operational flow returns to the part of the flow immediately before the step S112.

When the unlocking is successful, the setting cancellation unit 105 stores the acquired card unique ID and the inputted password in the password retention unit 101 in association with each other (paired up with each other) (step S115). It is to be noted that, when the password is already stored, the password is updated with the inputted password. This ends the processing of the unlocking and the password setting.

When the locked state is unlocked, the data access unit 107 is capable of getting access to various data stored in the data storage unit 202 to perform the read processing, the write processing, and the like.

According to such electronic device 100, it is possible to automatically unlock the lock of the memory card 200 using the password without adding a function to the memory card 200. In addition, even when the memory card 200 is inserted and detached, the lock is unlocked without repeated input of the password by the user so that convenience is improved.

For example, when the memory card 200 of which the password setting or the unlocking is once successfully performed by the electronic device 100 is connected, since the card unique ID and the password of the memory card 200 are recorded in the password retention unit 101 of the electronic device 100 in association with each other, the unlocking signal is automatically generated from the recorded information, and transmitted to the memory card 200. In the memory card 200, the password is extracted from the unlocking signal, the extracted password is compared with the password retained in the password retention unit 204, and it is possible to automatically perform the unlocking when the passwords match with each other.

As a case where the passwords do not match with each other, there can be considered a case where the password is changed by another electronic device after the memory card 200 is connected to the electronic device 100 and the card unique ID and the password are recorded in the password retention unit 101. In this manner, even in a case where the password is changed after it is once set, it is possible to perform the unlocking by inputting the password after the change by the key operation or the like. In this case, the unlocking is performed and, at the same time, the password before the change is updated with the inputted password as the password in correspondence to the card unique ID. Consequently, when the memory card 200 is connected after the update, it is possible to automatically perform the unlocking without performing the input of the password.

In addition, when the memory card 200 is connected to the electronic device 100 for the first time, since the card unique ID and the password of the memory card 200 are not recorded in the password retention unit 101, it is possible to perform the unlocking by inputting the password by the key operation or the like. In this case, the unlocking is performed and, at the same time, the card unique ID and the inputted password are stored in the password retention unit 101 in association with each other. Consequently, when the memory card 200 is connected after the storage, it is possible to automatically perform the unlocking without performing the input of the password.

Further, in a case where the locked state of the memory card 200 is not detected even when the memory card 200 is connected to the electronic device 100 and the power is supplied to the memory card 200, there can be considered a case where the password is not set in the memory card 200. In this case, it is possible to set the password by inputting the password by the key operation or the like. When the password is set, the card unique ID and the inputted password are stored in the password retention unit 101 in association with each other. Consequently, thereafter, when the memory card 200 is connected, the memory card 200 is automatically locked by supplying the power thereto, and the unlocking can be automatically performed without performing the input of the password.

When an external storage device which does not retain the card unique ID such as the hard disk or the like is connected to the electronic device 100 instead of the memory card 200, for example, there may be adopted an operation in which the unlocking signal including the password retained in the password retention table 101*a* is transmitted, the unlocking signal is generated by sequentially retrieving the password in the table until the unlocking is successfully performed, and the unlocking signal is kept transmitted until the unlocking signal is received. With this operation, even when the external storage device which dose not retain the card unique ID is connected to the electronic device 100, it is possible to automatically perform the unlocking.

Second Embodiment

Figure 5:
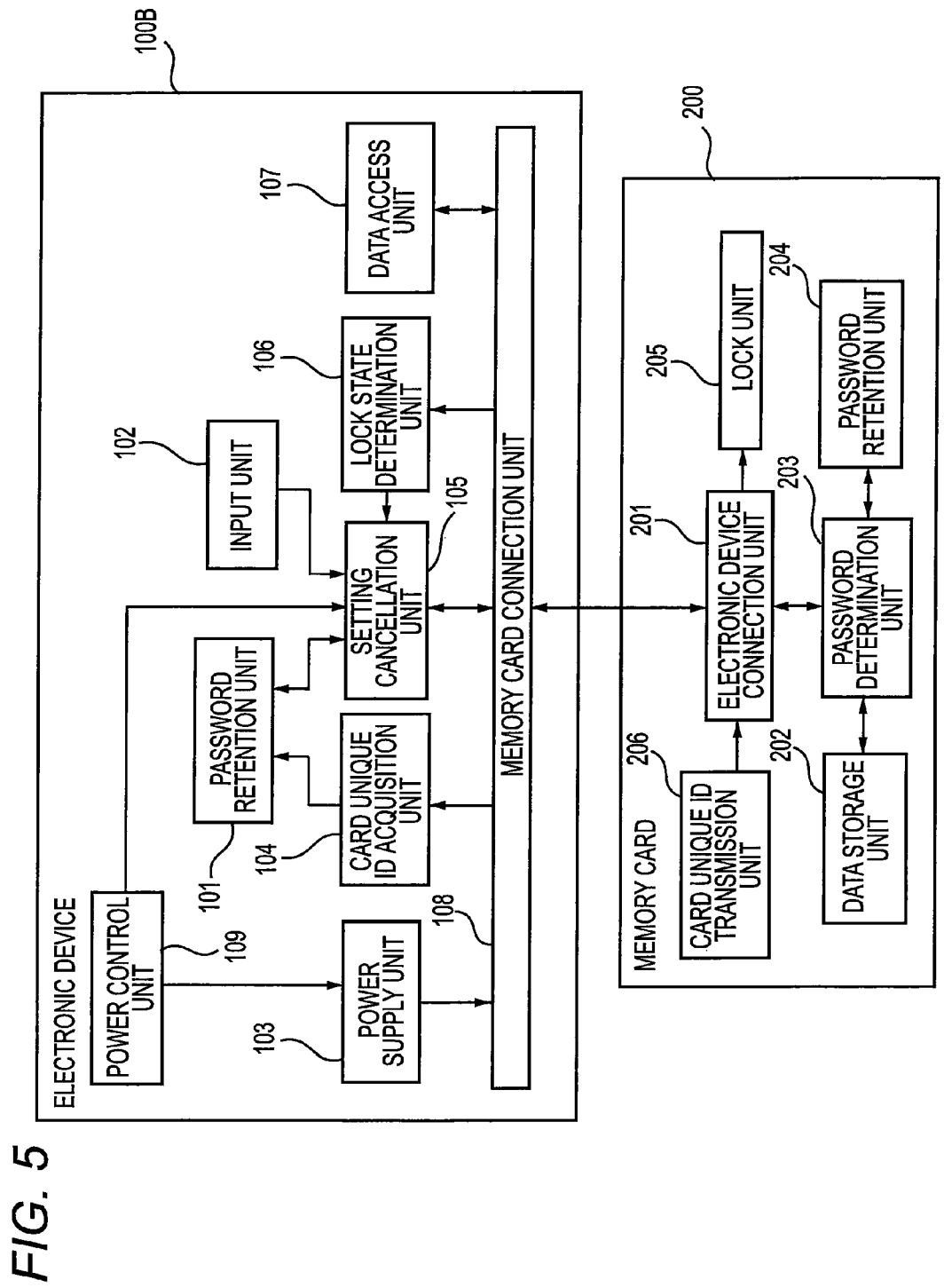
FIG. 5 is a view showing an example of a schematic configuration of an electronic device in a second embodiment of the present invention.

FIG. 5 is a view showing examples of schematic configurations of an electronic device 1008 and the memory card 200 in a second embodiment of the present invention. In the electronic device 1008 and the memory card 200, the description of the components which are the same as those in the configurations of the electronic device 100 and the memory card 200 shown in FIG. 1 will be omitted or simplified by retaining the same reference numerals. In addition, in the electronic device 1008, since operations thereof are similar to the operations of the electronic device 100 shown in FIGS. 3 and 4, only different operations will be described. As the electronic device 1008, there can be considered the PC, the PDA, the portable telephone terminal, the television, the digital still camera, the digital video camera, the IC recorder, the printer, the AV player, the AV recorder, the HDD portable storage, the car navigation terminal, and other electronic devices each to which the external storage device such as the memory card 200 or the like can be connected.

The electronic device 100B has a power control unit 109 in addition to the components of the electronic device 100. The power control unit 109 controls power supplied to the memory card 200.

Next, a description will be given to an example of the operations of the electronic device 100B. The electronic device 100B also performs the processing of FIGS. 3 and 4 similarly to the electronic device 100.

When the memory card 200 is connected to the electronic device 100 but not in use, the power control unit 109 controls the power such that the power supply to the memory card 200 by the power supply unit 103 is stopped. In other words, the electronic device 100B does not perform the processing in the steps S102 to S115 in FIGS. 3 and 4 to suspend the processing. For example, when a data access request by the data access unit 107 dose not occur for a predetermined time period, it is determined herein that the memory card 200 is not in use.

In addition, when the memory card 200 is put in use from a state where the power supply to the memory card 200 is stopped, the power control unit 109 controls the power such that the power supply to the memory card 200 by the power supply unit 103 is resumed. In other words, the electronic device 100B resumes the processing in the steps S102 to S115 in FIGS. 3 and 4. For example, when the data access request by the data access unit 107 occurs, it is determined herein that the memory card 200 is put in use.

According to such electronic device 100B, even when the power supplied to the memory card 200 is controlled in order to suppress the power consumption of the memory card 200, the lock is unlocked without the repeated input of the password by the user so that convenience is improved.

Third Embodiment

Figure 6:
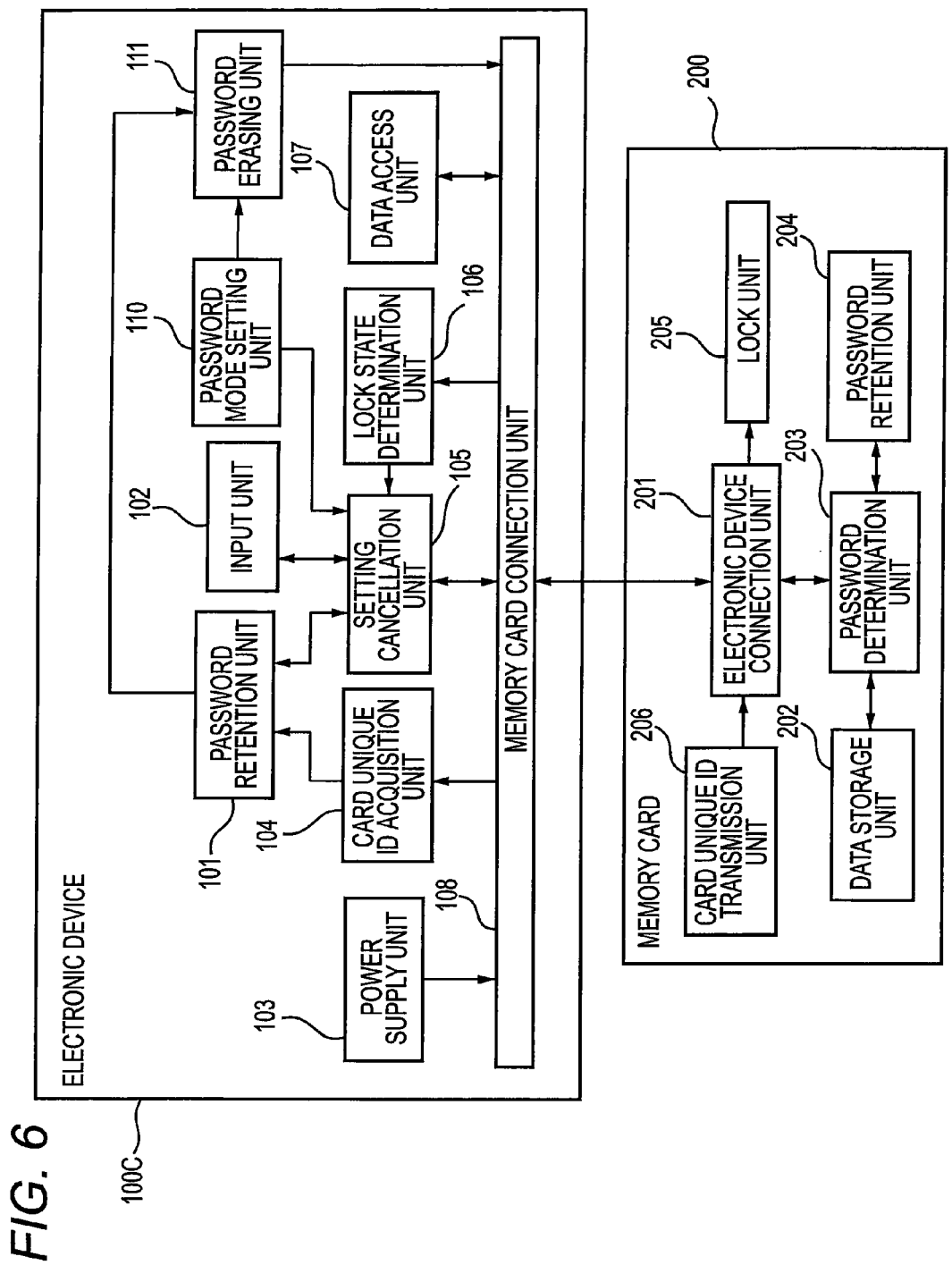
FIG. 6 is a view showing an example of a schematic configuration of an electronic device in a third embodiment of the present invention.

FIG. 6 is a view showing examples of schematic configurations of an electronic device 100C and the memory card 200 in a third embodiment of the present invention. In the electronic device 100C and the memory card 200, the description of the components which are the same as those in the configurations of the electronic device 100 and the memory card 200 shown in FIG. 1 will be omitted or simplified by retaining the same reference numerals. As the electronic device 100C, there can be considered the PC, the PDA, the portable telephone terminal, the television, the digital still camera, the digital video camera, the IC recorder, the printer, the AV player, the AV recorder, the HDD portable storage, the car navigation terminal, and other electronic devices each to which the external storage device such as the memory card 200 or the like can be connected.

The electronic device 100C has a password mode setting unit 110 and a password erasing unit 111 in addition to the components of the electronic device 100.

The password mode setting unit 110 sets a password setting mode for setting the password or a password erasing mode for erasing the password as the password mode for operating the password of the memory card 200. The password mode may also be set by the input by the input unit 102.

When the password mode is set to the password erasing mode, the password erasing unit 111 transmits a password erasing signal for erasing the password retained in the password retention unit 204 of the memory card 200 to the memory card 200 via the memory card connection unit 108.

The password erasing signal includes the password of the memory card 200 retained in the password retention unit 101 and the control signal.

In addition to the function of the password determination unit of the first embodiment, the password determination unit 203 has a function of searching the password retention unit 204 and erasing the password identical with the password included in the password erasing signal when the password determination unit 203 acquires the password erasing signal via the electronic device connection unit 201.

Figure 7:
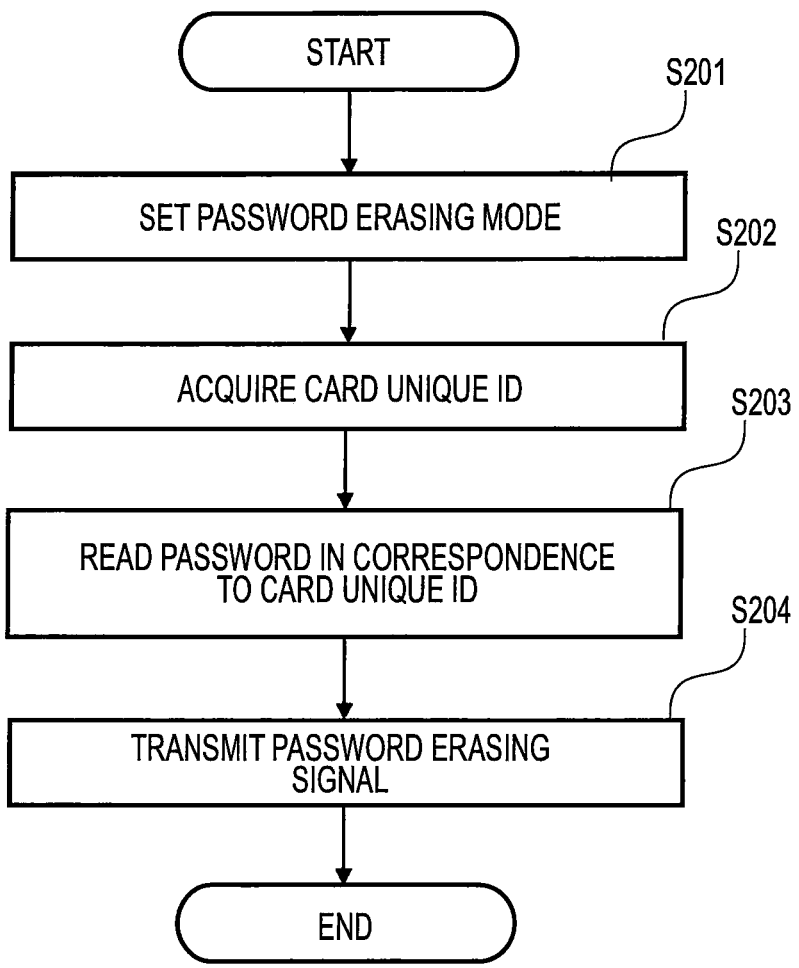
FIG. 7 is a flow chart showing an example of operations when the electronic device in the third embodiment of the present invention is in a password erasing mode.

Next, a description will be given to an example of the operations when the electronic device 100C is in the password erasing mode. FIG. 7 is a view showing the example of the operations when the electronic device 100C is in the password erasing mode. It is to be noted that the card unique ID and the password of the memory card 200 connected to the electronic device 100C are assumed to be retained in the password retention unit 101.

First, the password mode setting unit 110 sets the password erasing mode as the password mode (step S201).

Subsequently, the card unique ID acquisition unit 104 acquires the card unique ID from the memory card 200 (step S202). It is to be noted that the steps S201 and S202 are in no particular order.

Then, the password erasing unit 111 reads the password in correspondence to the card unique ID identical with the acquired card unique ID by searching the password retention unit 101 (step S203). It is to be noted that, when the card unique ID identical with the acquired card unique ID is not present in the password retention unit 101, the input unit 102 may also be adapted to input the password by the instruction of the user according to a sequence similar to the step S112.

Next, the password erasing unit 111 transmits the password erasing signal including the read password (step S204). It is to be noted that, when the password erasing is unsuccessful, the input unit 102 may also be adapted to input the password by the instruction of the user according to the sequence similar to the step S112. It is possible to determine whether or not the password erasing is successful by, e.g., whether or not a password erasing completion signal indicative of the completion of the password erasing is received from the memory card 200.

By providing such password erasing mode, even other electronic devices which do not have the password function and are not capable of reading data in the memory card with the password added thereto become capable of reading the data in the memory card 200.

Figure 8:
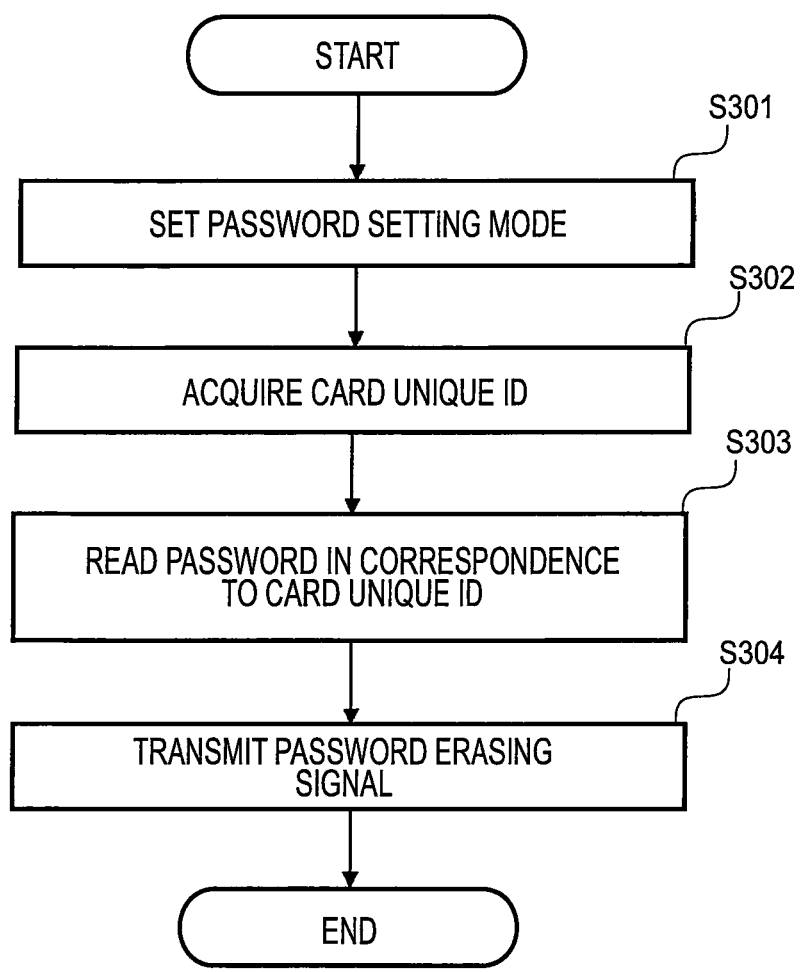
FIG. 8 is a flow chart showing an example of operations when the electronic device in the third embodiment of the present invention is in a password setting mode.

Next, a description will be given to an example of the operations when the electronic device 100C is in the password setting mode. FIG. 8 is a view showing the example of the operations when the electronic device 100C is in the password setting mode. It is to be noted that the card unique ID and the password of the memory card 200 connected to the electronic device 100C are assumed to be retained in the password retention unit 101.

First, the password mode setting unit 110 sets the password setting mode as the password mode (step S301).

Subsequently, the card unique ID acquisition unit 104 acquires the card unique ID from the memory card 200 (step S302). It is to be noted that the steps S301 and S302 are in no particular order.

Next, the setting cancellation unit 105 searches the password retention unit 101 to read the password in correspondence to the card unique ID identical with the acquired card unique ID (step S303). It is to be noted that, when the card unique ID identical with the acquired card unique ID is not present, the password is inputted by the input unit 102, and the password may be treated as the read password. With this operation, it becomes possible to reliably set the password in the memory card 200 in which the password is not set.

Then, the setting cancellation unit 105 transmits the password setting signal including the read password (step S304).

By providing such password setting mode, when the deletion or resetting of the password is performed with respect to, e.g., the memory card 200 in which the password has been set once, it becomes possible to automatically delete the password of the memory card 200, and add the password to the memory card 200 without the repeated input of the password so that convenience is improved.

Fourth Embodiment

Figure 9:
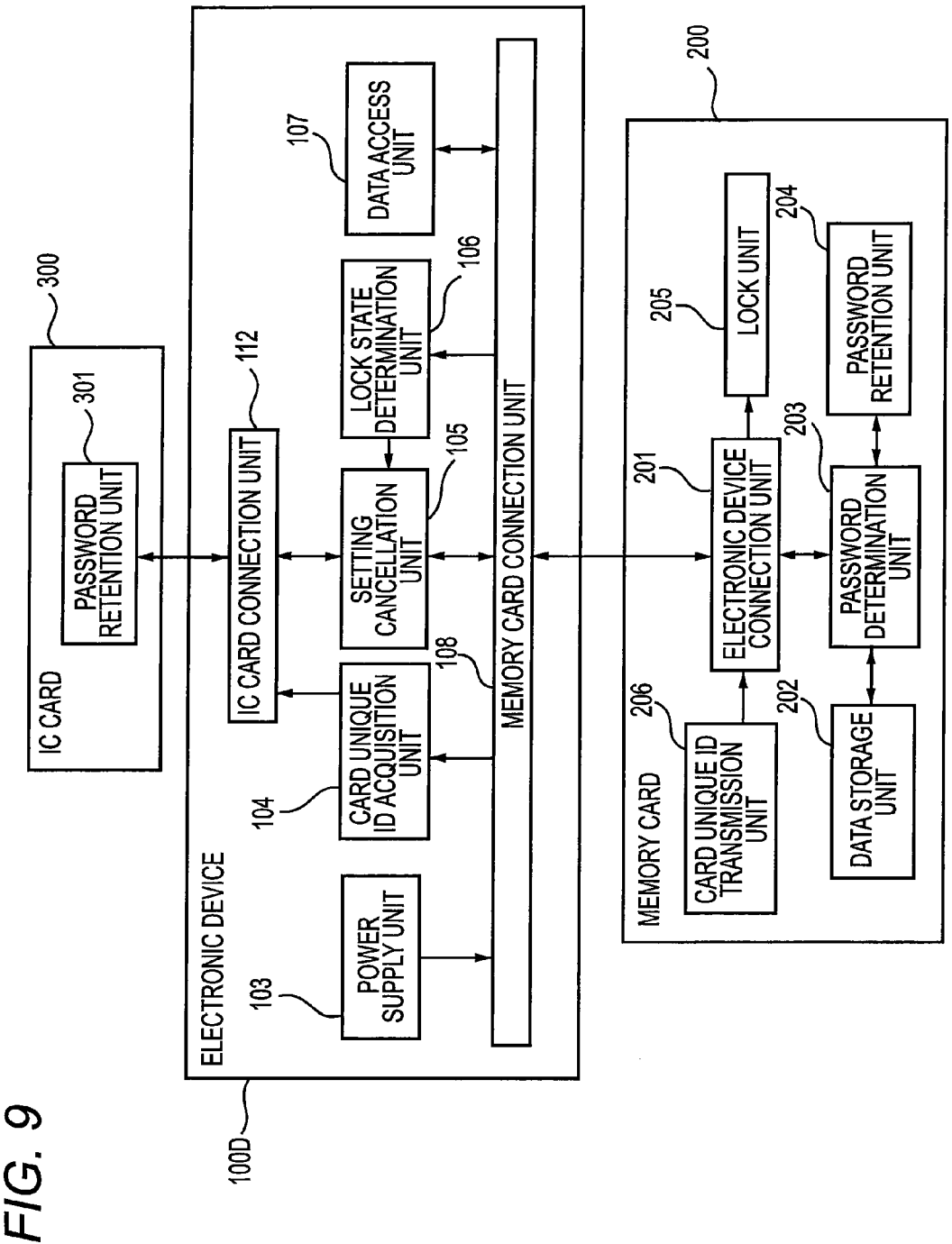
FIG. 9 is a view showing an example of a schematic configuration of an electronic device in a fourth embodiment of the present invention.

FIG. 9 is a view showing examples of schematic configurations of an electronic device 100D, the memory card 200, and an IC card 300 in a fourth embodiment of the present invention. In the electronic device 100D and the memory card 200, the description of the components which are the same as those in the configurations of the electronic device 100 and the memory card 200 shown in FIG. 1 will be omitted or simplified by retaining the same reference numerals. In addition, in the electronic device 100D, since operations thereof are similar to the operations of the electronic device 100 shown in FIGS. 3 and 4, only different operations will be described. As the electronic device 100D, there can be considered the PC, the PDA, the portable telephone terminal, the television, the digital still camera, the digital video camera, the IC recorder, the printer, the AV player, the AV recorder, the HDD portable storage, the car navigation terminal, and other electronic devices each to which the external storage device such as the memory card 200 or the like can be connected.

The electronic device 100D includes the power supply unit 103, the card unique ID acquisition unit 104, the setting cancellation unit 105, the lock state determination unit 106, the data access unit 107, the memory card connection unit 108, and an IC card connection unit 112.

The IC card connection unit 112 is a unit for connecting the IC card 300, and is, e.g., the connection terminal. For example, the insertion of the IC card 300 into an IC card slot allows the data exchange with the IC card 300.

The IC card 300 is, e.g., a SIM (Subscriber Identity Module) card, and has a password retention unit 301. The IC card 300 has an IC unique ID as identification information on the IC card 300.

The password retention unit 301 has a function similar to that of the password retention unit 101 of the electronic device 100. In addition, the password retention unit 301 does not need to retain the password optionally set for each memory card 200 when the IC unique ID is used as the password in correspondence to each card unique ID.

Next, a description will be given to an example of the operations of the electronic device 100D. The electronic device 100D also performs the processing in FIGS. 3 and 4 similarly to the electronic device 100.

When performing the processing in FIGS. 3 and 4, the electronic device 100D performs read and storage of the card unique ID and the password with respect to the password retention unit 301 via the IC card connection unit 112. In other words, the electronic device 100 performs the input of the password using the input unit 102, the storage of the card unique ID and the password into the password retention unit 101, and the read of the password from the password retention unit 101. However, the electronic device 100D performs the processing in FIGS. 3 and 4 by using the password retention unit 301 of the IC card 300 instead of using the password retention unit 101 and the input unit 102 to carry out the password setting and the unlocking. In this case, in order to perform the data storage and data reference such as the read of data or the like, the access request is transmitted to the IC card 300.

According to such electronic device 100D, even when the IC card 300 such as the SIM card is inserted into another electronic device and used, it is possible to use the memory card 200 without the re-input of the password so that convenience is improved. In addition, by inserting the IC card having the password stored therein into another device having the function of the electronic device 100D, it is possible to transfer the password to the another device.

In addition, when the IC unique ID is retained as the password in the password retention unit 301, it becomes possible for the user to perform the password setting and the unlocking of the memory card 200 without performing the input of the password. Further, it becomes possible to reduce the number of passwords which the user is required to memorize. In this case, it is to be noted that the IC unique ID is automatically set as the password without performing the input of the password by the input unit 102 in the electronic device 100D.

Furthermore, when the IC unique ID is used as the password, since the password is same for all memory cards 200, the password retention unit 301 does not need to be provided, and the password retention unit may be provided in the electronic device 100D.

Fifth Embodiment

Figure 10:
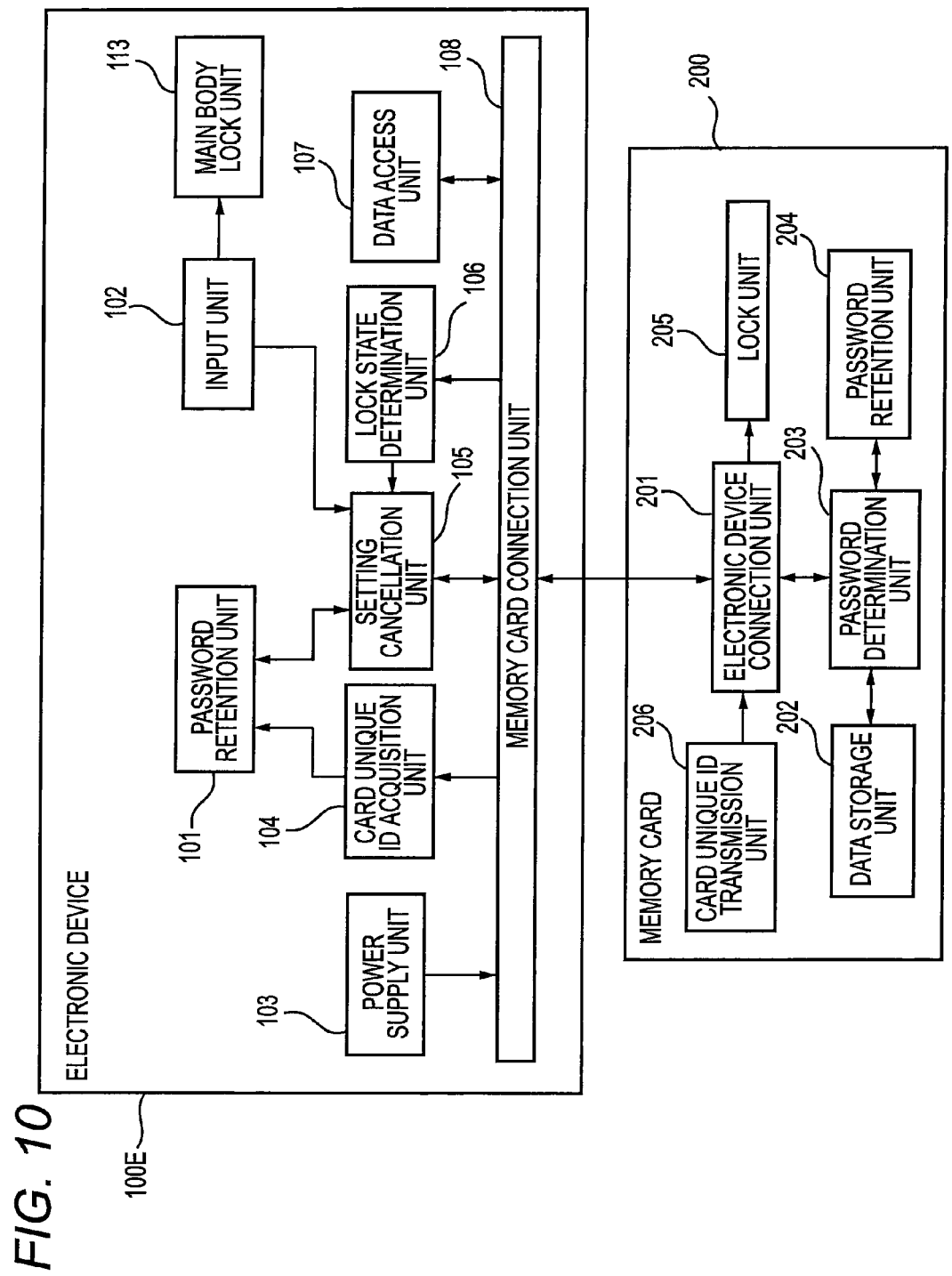
FIG. 10 is a view showing an example of a schematic configuration of an electronic device in a fifth embodiment of the present invention.

FIG. 10 is a view showing examples of schematic configurations of an electronic device 100E and the memory card 200 in a fifth embodiment of the present invention. In the electronic device 100E and the memory card 200, the description of the components which are the same as those in the configurations of the electronic device 100 and the memory card 200 shown in FIG. 1 will be omitted or simplified by retaining the same reference numerals. In addition, in the electronic device 100E, since operations thereof are similar to the operations of the electronic device 100 shown in FIGS. 3 and 4, only different operations will be described. As the electronic device 100E, there can be considered the PC, the PDA, the portable telephone terminal, the television, the digital still camera, the digital video camera, the IC recorder, the printer, the AV player, the AV recorder, the HDD portable storage, the car navigation terminal, and other electronic devices each to which the external storage device such as the memory card 200 or the like can be connected.

The electronic device 100E has a main body lock unit 113 in addition to the components of the electronic device 100.

The password retention unit 101 retains each card unique ID and the password for locking and unlocking a main body of the electronic device 100E.

The input unit 102 performs the input of the password for locking and unlocking the main body of the electronic device 100E and the like.

The main body lock unit 113 locks and unlocks the main body of the electronic device 100E using the password. The portion locked by the main body lock unit 112 may include all functions or a part of the functions of the electronic device 100E.

Next, a description will be given to an example of the operations of the electronic device 100E. The electronic device 100E also performs the processing in FIGS. 3 and 4 similarly to the electronic device 100.

When performing the processing in FIGS. 3 and 4, in the electronic device 100E, the input of the password by the input unit 102 is not performed, but a password of the main body of the electronic device 100E is automatically set as the password. For example, when the password is set or the unlocking is performed, instead of the processing of inputting the password (e.g., the steps S105 and S112), the password of the main body of the electronic device 100E retained in the password retention unit 101 is used.

According to such electronic device 100E, it is possible to set the password used in the main body of the electronic device 100E as the password of the memory card 200, and it becomes possible for the user to perform the password setting and the unlocking of the memory card 200 without performing the input of the password. Further, it becomes possible to reduce the number of passwords which the user is required to memorize.

Sixth Embodiment

Figure 11:
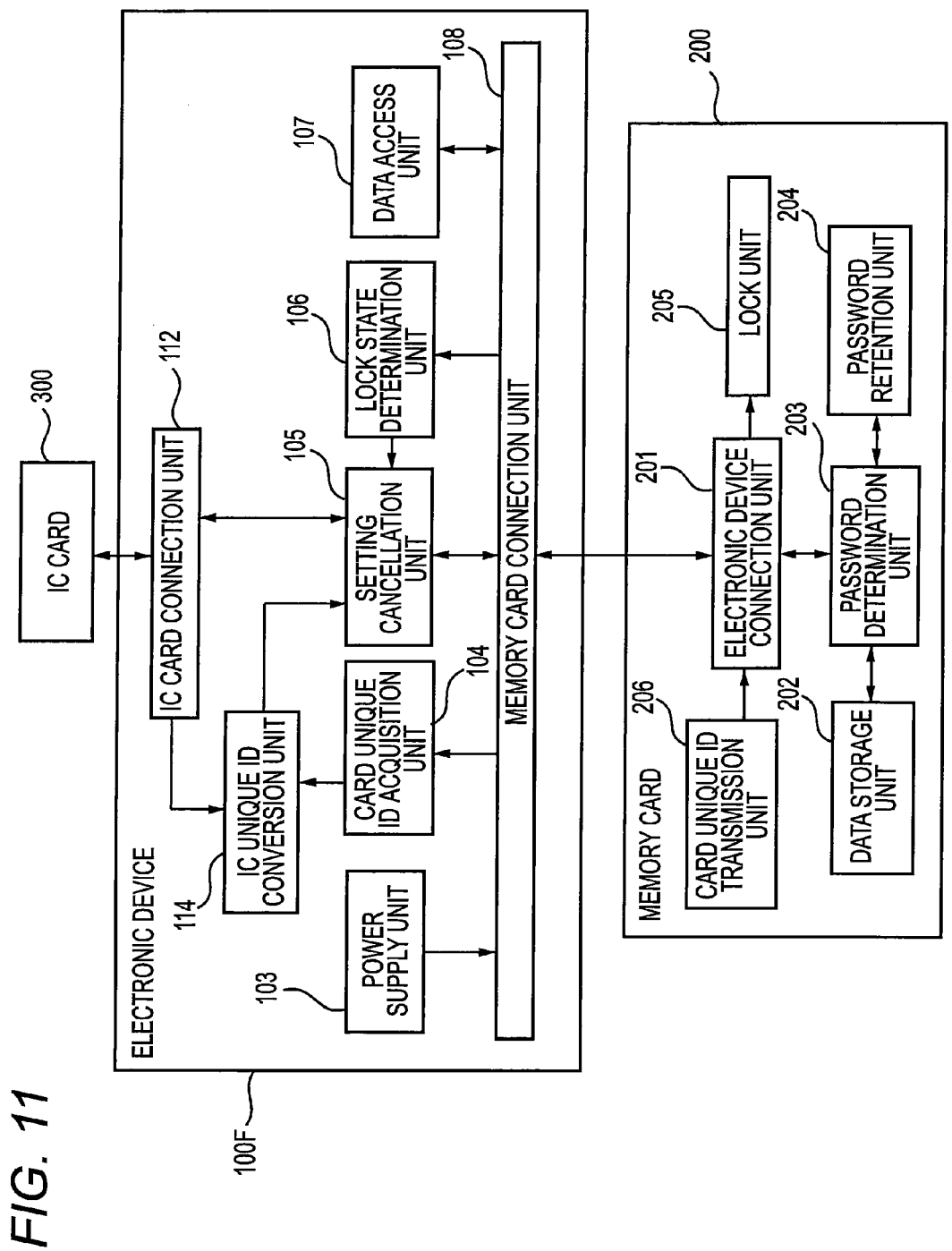
FIG. 11 is a view showing an example of a schematic configuration of an electronic device in a sixth embodiment of the present invention.

FIG. 11 is a view showing examples of schematic configurations of an electronic device 100F, the memory card 200, and the IC card 300 in a sixth embodiment of the present invention. In the electronic device 100F and the memory card 200, the description of the components which are the same as those in the configurations of the electronic device 100 and the memory card 200 shown in FIG. 1 will be omitted or simplified by retaining the same reference numerals. In addition, in the electronic device 100F, since operations thereof are similar to the operations of the electronic device 100 shown in FIGS. 3 and 4, only different operations will be described. As the electronic device 100F, there can be considered the PC, the PDA, the portable telephone terminal, the television, the digital still camera, the digital video camera, the IC recorder, the printer, the AV player, the AV recorder, the HDD portable storage, the car navigation terminal, and other electronic devices each to which the external storage device such as the memory card 200 or the like can be connected.

When compared with the components of the electronic device 100, the electronic device 100F does not include the password retention unit 101 and the input unit 102, and has the IC card connection unit 112 and an IC unique ID conversion unit 114. It is to be noted that the IC unique ID conversion unit has a function as "a password generation part".

The IC card connection unit 112 is a unit for connecting the IC card 300, and is, e.g., the connection terminal. For example, the insertion of the IC card 300 into the IC card slot allows the data exchange with the IC card 300.

The IC unique ID conversion unit 114 generates the password on the basis of the card unique ID of the memory card 200 and the IC unique ID of the IC card 300, and directly sends the password to the setting cancellation unit 105 so as to carry out the password setting and the unlocking of the memory card 200.

The IC card 300 is, e.g., the SIM (Subscriber Identity Module) card. The IC card 300 has the IC unique ID as the identification information on the IC card 300.

Next, a description will be given to an example of the operations of the electronic device 100F. The electronic device 100F also performs the processing in FIGS. 3 and 4 similarly to the electronic device 100.

When performing the processing in FIGS. 3 and 4, in the electronic device 100F, the input of the password by the input unit 102 is not performed, but the password generated by the IC unique ID conversion unit 114 is used. When the password is set or the unlocking is performed, instead of the processing of inputting the password (e.g., the steps S105 and S112), the password generation by the IC unique ID conversion unit 114 is performed, and the password is sent to the setting cancellation unit 105.

According to such electronic device 100F, it becomes possible for the user to perform the password setting and the unlocking of the memory card 200 without performing the input of the password. Further, since the different password is set for each memory card 200, the password is made safer than conventional passwords in terms of security.

Seventh Embodiment

Figure 12:
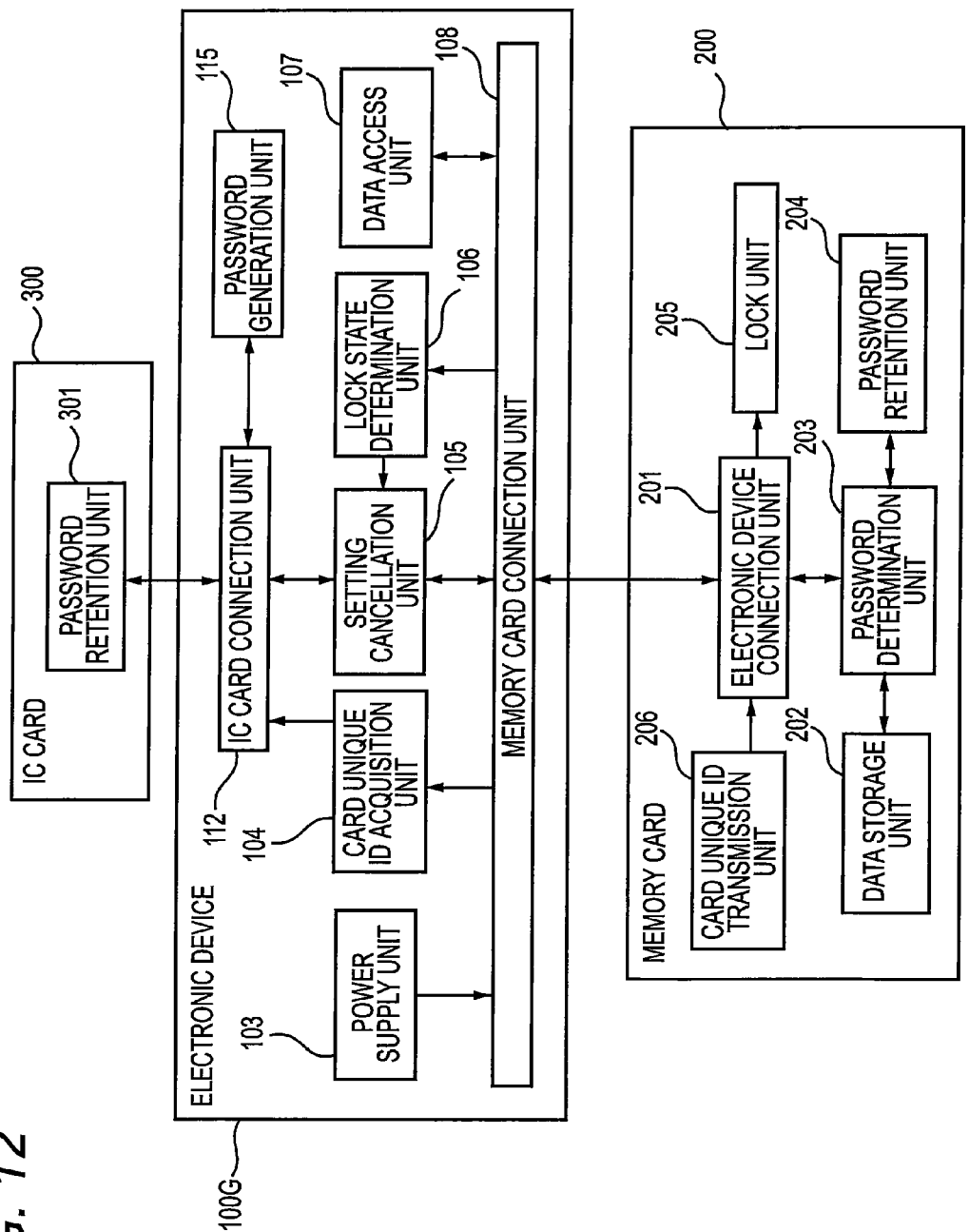
FIG. 12 is a view showing an example of a schematic configuration of an electronic device in a seventh embodiment of the present invention.

FIG. 12 is a view showing examples of schematic configurations of an electronic device 1000, the memory card 200, and the IC card 300 in a seventh embodiment of the present invention. In the electronic device 100G and the memory card 200, the description of the components which are the same as those in the configurations of the electronic device 100 and the memory card 200 shown in FIG. 1 will be omitted or simplified by retaining the same reference numerals. In addition, in the electronic device 100G, since operations thereof are similar to the operations of the electronic device 100 shown in FIGS. 3 and 4, only different operations will be described. As the electronic device 1000, there can be considered the PC, the PDA, the portable telephone terminal, the television, the digital still camera, the digital video camera, the IC recorder, the printer, the AV player, the AV recorder, the HDD portable storage, the car navigation terminal, and other electronic devices each to which the external storage device such as the memory card 200 or the like can be connected.

The electronic device 100G includes the power supply unit 103, the card unique ID acquisition unit 104, the setting cancellation unit 105, the lock state determination unit 106, the data accessing unit 107, the memory card connection unit 108, the IC card connection unit 112, and a password generation unit 115.

The IC card connection unit 112 is a unit for connecting the IC card 300, and is, e.g., the connection terminal. For example, the insertion of the IC card 300 into the IC card slot allows the data exchange with the IC card 300.

The password generation unit 115 generates the password, and stores the password in the password retention unit 301 via the IC card connection unit 113. With regard to the method for generating the password, for example, the password may be generated by performing the conversion or encryption based on the IC unique ID of the IC card 300 and the card unique ID of the memory card 200, or the password may be generated by using a random value or time without being based on these. The generation of the password is performed for each card unique ID of the memory card 200.

The IC card is, e.g., the SIM (Subscriber Identity Module) card, and has the password retention unit 301. The IC card 300 has the IC unique ID as the identification information on the IC card 300.

The password retention unit 301 has the function similar to that of the password retention unit 101 of the electronic device 100. In addition, the password retention unit 301 may be provided in the electronic device 100G instead of being provided in the IC card 300.

Next, a description will be given to an example of the operations of the electronic device 100G. The electronic device 100G also performs the processing in FIGS. 3 and 4 similarly to the electronic device 100.

When performing the processing in FIGS. 3 and 4, in the electronic device 100G, the input of the password by the input unit 102 is not performed, but the password generated by the password generation unit 115 is used. When the password is set, instead of the processing of inputting the password (e.g., the steps S105 and S112), the password generation by the password generation unit 115 is performed, and the password is stored in the password retention unit 301.

According to such electronic device 100G, it becomes possible for the user to perform the password setting and the unlocking of the memory card 200 without performing the input of the password. In addition, the generated password becomes difficult to be estimated so that the password is made safer than conventional passwords in terms of security.

Eighth Embodiment

Figure 13:
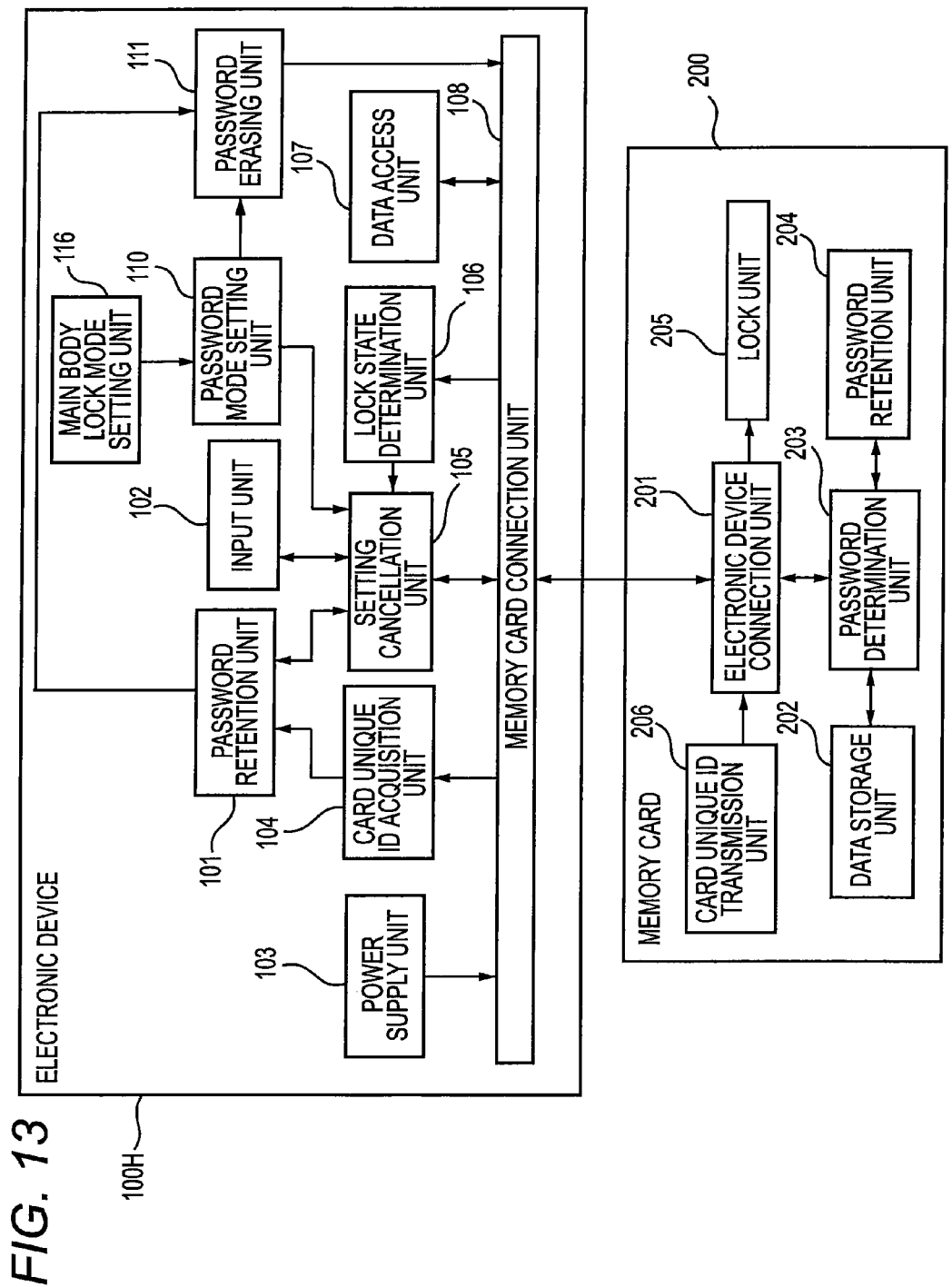
FIG. 13 is a view showing an example of a schematic configuration of an electronic device in an eighth embodiment of the present invention.

FIG. 13 is a view showing an example of schematic configurations of an electronic device 100H and the memory card 200 in an eighth embodiment of the present invention. In the electronic device 100H and the memory card 200, the description of the components which are the same as those in the configurations of the electronic device 100 C and the memory card 200 shown in FIG. 6 will be omitted or simplified by retaining the same reference numerals. In the electronic device 100H, since operations thereof are similar to the operations of the electronic device 100C shown in FIGS. 7 and 8, only different operations will be described. As the electronic device 100H, there can be considered the PC, the PDA, the portable telephone terminal, the television, the digital still camera, the digital video camera, the IC recorder, the printer, the AV player, the AV recorder, the HDD portable storage, the car navigation terminal, and other electronic devices each to which the external storage device such as the memory card 200 or the like can be connected.

The electronic device 100H has a main body lock mode setting unit 116 in addition to the components of the electronic device 100C.

As main body lock modes related to the lock of the electronic device 100H, the main body lock mode setting unit 116 sets a main body locking mode for locking all or a part of functions of the electronic device 100H, or a main body unlocking mode for unlocking the lock. It is to be noted that switching between the main body lock modes may require the password for the switching between the main body lock modes.

Next, a description will be given to an example of the operations of the electronic device 100H. The electronic device 100H also performs the processing in FIGS. 7 and 8 similarly to the electronic device 100C.

When the main body locking mode is set by the main body lock mode setting unit 116, the main body lock mode setting unit 116 controls the password mode setting unit 110 such that the password setting mode is set. Then, the electronic device 100H performs the processing in FIG. 8.

On the other hand, when the main body unlocking mode is set by the main body lock mode setting unit 116, the main body lock mode setting unit 116 controls the password mode setting unit 110 such that the password erasing mode is set. Then, the electronic device 100H performs the processing in FIG. 7.

According to such electronic device 100H, when the deletion or resetting of the password is performed with respect to the memory card 200 in which the password has been set once in conjunction with the locking and unlocking of the main body of the electronic device 100H, it becomes possible to automatically delete the password in the memory card 200, and add the password thereto without the repeated input of the password so that convenience is improved.

For example, by setting the main body locking mode in the electronic device 100H to lock the electronic device 100H such as the portable telephone terminal or the like using the password, it is possible to set the password in the memory card 200 to lock the memory card 200. Consequently, in this case, even when the memory card 200 is lost or stolen, or the electronic device 100H is lost or stolen, it is possible to prevent information leakage of data stored in the memory card 200.

It is to be noted that the password for locking all or a part of functions of the main body of the electronic device 100H may be used as the password of the memory card 200 instead of the input of the password by the input unit 102. In addition, the password may be generated by the methods for generating the password described in other embodiments and used as the password.

Ninth Embodiment

An electronic device 100I in a ninth embodiment of the present invention has the components of any one of the electronic devices 100, and 100B to 100H, and a display part 117 that is not shown. The electronic device 100I performs the processing described in the above-described embodiments. As the electronic device 100I, there can be considered the PC, the PDA, the portable telephone terminal, the television, the digital still camera, the digital video camera, the IC recorder, the printer, the AV player, the AV recorder, the HDD portable storage, the car navigation terminal, and other electronic devices each to which the external storage device such as the memory card 200 or the like can be connected.

the display part 117 performs various data displays. The display part 117 mainly displays herein a lock icon indicating that the password is already set and the memory card 200 is locked, an unlock icon indicating that the password is already set and the memory card 200 is unlocked, and a password unset icon indicating that the password of the memory card 200 is not set. In FIG. 14, (a) is a view showing an example of the electronic device 100I performing the display, while in FIG. 14, (b) is a view showing examples of the icons displayed by the display part 117.

It is possible to recognize that the password is already set and the memory card 200 is locked from, e.g., the operation that the memory card 200 is automatically brought into the locked state after the power supply to the memory card 200. For example, in the case of "Yes" in the step S104 of FIG. 3, the password is already set and the memory card 200 is locked.

It is possible to recognize that the password is already set and the memory card 200 is unlocked from, e.g., the operation that the memory card 200 is automatically brought into the locked state after the power supply to the memory card 200 and, thereafter, the unlocking is successfully performed using the unlocking signal. For example, in the case of "Yes" in the step S111 of FIG. 3 and in the case of "Yes" in the step S114, the password is already set and the memory card 200 is unlocked.

It is possible to recognize that the password is not set from, e.g., the operation that the memory card 200 is not automatically brought into the locked state after the power supply to the memory card 200. For example, in the case of "No" in the step S104 of FIG. 3, the password is not set.

Next, a description will be given to an example of display processing by the display part 117 in the electronic device 100I.

FIG. 15 is a view showing examples of the screen displays when the password is set in the memory card 200 in a case where the memory card 200 in which the password is not set is connected.

When the electronic device 100I needs the input of the password by the input unit 102 similarly to, e.g., the electronic devices 100, 100B, and 100C, first, as shown in (a) of FIG. 15, the display part 117 displays a setting screen of the password. In this screen, the password unset icon is displayed.

Subsequently, as shown in (b) of FIG. 15, the display part 117 displays an input screen of the password. In this screen, the password unset icon is continuously displayed.

Then, as shown in (c) of FIG. 15, the display part 117 displays an unlocking screen after the input of the password. In this screen, the unlock icon is displayed.

With the screen displays of FIG. 15, it is possible to instantly ascertain that the memory card is brought into the unlocked state after the password is set from the state where the password of the memory card 200 is not set.

Figure 16:
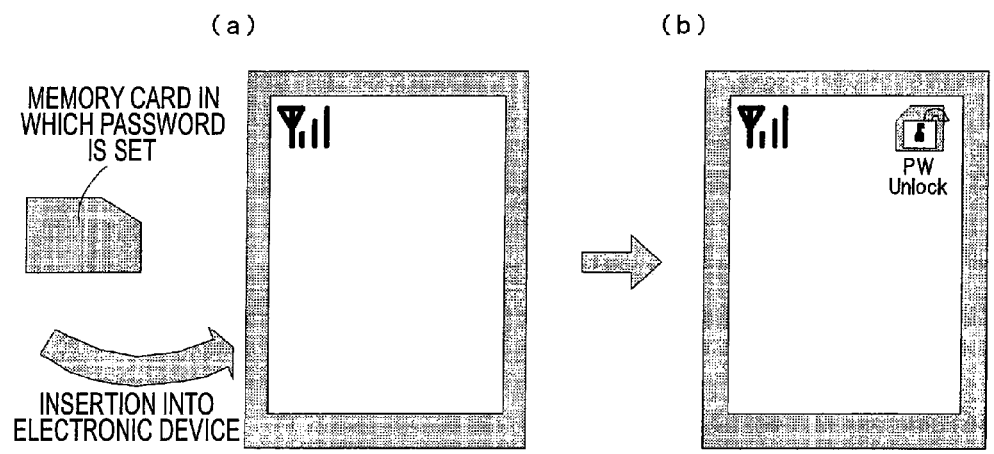
FIG. 16 shows examples of screen displays by the display part of the electronic device in the ninth embodiment of the present invention.

FIG. 16 is a view showing examples of the screen displays when the password is already set in the memory card 200, and the electronic device 100I or the IC card 300 retains the card unique ID and the password of the memory card 200.

In the electronic device 100I, when the password is set, and the card unique ID and the password of the memory card 200 are retained in the password retention part 101 or the IC card 300 similarly to, e.g., the electronic devices 100, 100B, 100C, 100D, 100100F, and 100G, before the insertion of the memory card 200 in which the password is set into the electronic device 100I or the like, the display part 117 displays, e.g., a screen shown in (a) of FIG. 16. In addition, in this screen, the display of the icon is not performed.

Subsequently, when the memory card 200 is inserted into the electronic device 100I, and the unlocking is performed after the authentication of the memory card 200 is performed using the password retained in the password retention part 101 or the like, as shown in (b) of FIG. 16, the display part 117 displays the unlocking screen. In this screen, the unlock icon is displayed.

With the screen displays of FIG. 16, it is possible to instantly ascertain that the password is not unset, but the password is set in the memory card 200 and the memory card 200 is brought into the unlocked state after the password authentication.

Figure 17:
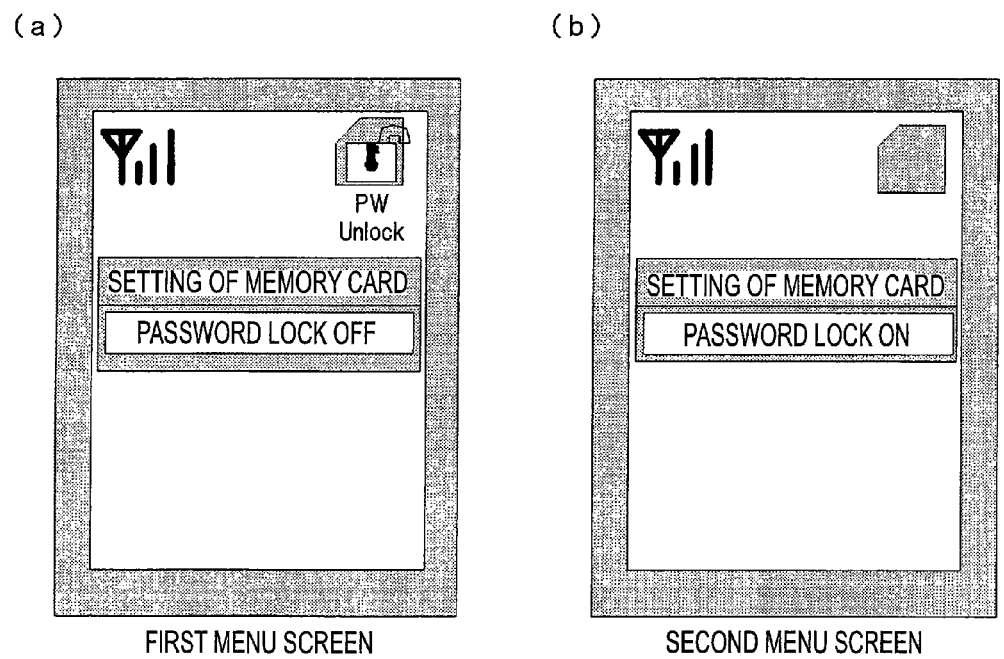
FIG. 17 shows examples of screen displays by the display part of the electronic device in the ninth embodiment of the present invention.

FIG. 17 is a view showing examples of screen displays of a password mode setting menu.

When the electronic device 100I sets the password mode similarly to, e.g., the electronic device 100C, as shown in (a) of FIG. 17, the display part 117 displays a first menu screen. The first menu screen is a screen for performing switching from the password setting mode to the password erasing mode when the password setting mode is set. In this screen, the unlock icon is displayed.

In addition, as shown in (b) of FIG. 17, the display part displays a second menu screen. The second menu screen is a screen for performing switching from the password erasing mode to the password setting mode when the password erasing mode is set. In this screen, the password unset icon is displayed.

With the screen displays of FIG. 17, it becomes possible to determine whether the memory card 200 is in the unlocked state though the password is set in the memory card 200 or the password is not set, and switch the password mode.

Figure 18:
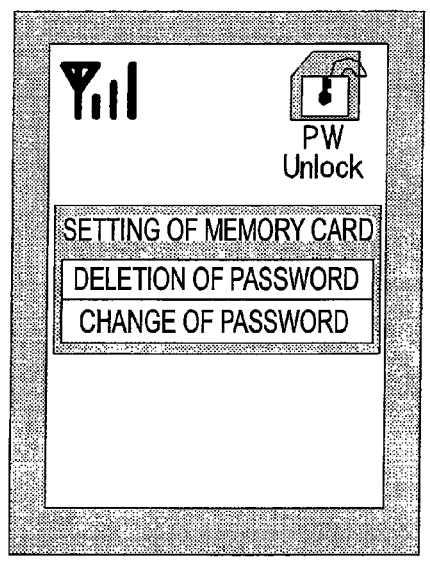
FIG. 18 shows an example of a screen display by the display part of the electronic device in the ninth embodiment of the present invention.

FIG. 18 is a view showing an example of a screen display of a password deleting/changing menu.

When the electronic device 100I deletes or changes the password set in the memory card 200 similarly to, e.g., the electronic devices 100 and 1008, as shown in FIG. 18, the display part 117 displays the password deleting/changing menu. In this screen, the unlock icon is displayed. It is to be noted that, by permitting the deleting or changing of the password only when the unlocking is successfully performed, it is not necessary to cause the user to perform verification of the password so that convenience is improved.

With the screen display of FIG. 18, it is possible to determine whether the memory card 200 is in the unlocked state though the password is set in the memory card 200 or the password is not set, and perform the erasing or changing of the password.

A brief description will be given herein to an example of operations when the electronic device 100I performs the deleting and changing of the password.

With regard to the changing of the password, a new password inputted from the input unit 102 is read, the corresponding password is read as the present password from the password retention unit 101, and the setting cancellation unit 105 transmits the new password and the present password to the memory card 200 to change the password set in the memory card 200. In addition, at that time, the corresponding password in the password retention table 101a is updated with the new password.

With regard to the deleting of the password, the corresponding password is read as the present password from the password retention unit 101, and the setting cancellation unit 105 transmits the present password to the memory card 200 to delete the password set in the memory card 200. At this time, in the case of the password erasing mode, the password is not deleted from the password retention table 101a. On the other hand, in the case of the mode other than the password erasing mode, the password may be deleted from the password retention table 101a.

Figure 19:
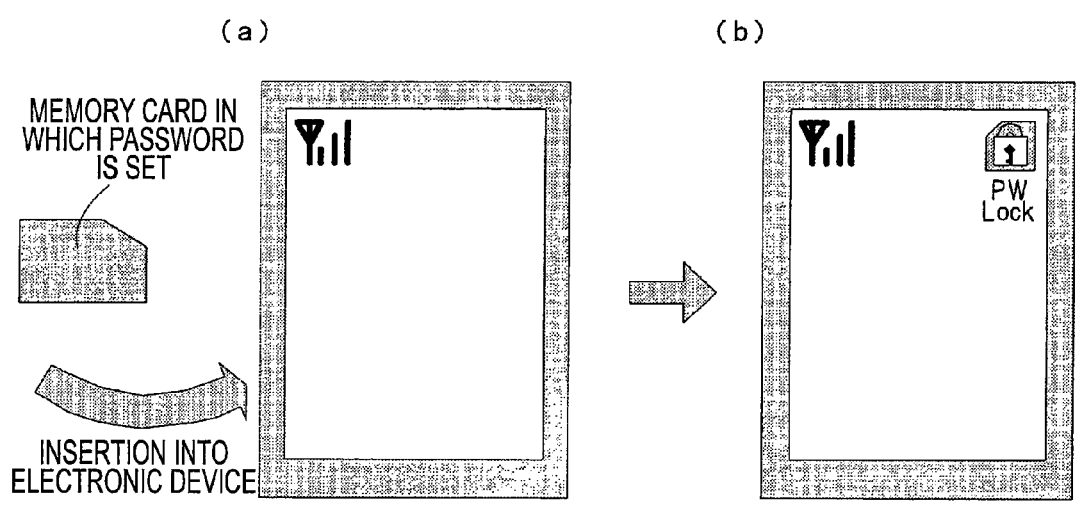
FIG. 19 shows examples of the screen displays by the display part of the electronic device in the ninth embodiment of the present invention.

FIG. 19 is a view showing examples of screen displays when the password is already set, but the electronic device 100I or the IC card 300 retains the card unique ID of the memory card 200 and the password which is not in correspondence to the card unique ID.

In the electronic device 100I, when the password is already set, similarly to, e.g., the electronic devices 100, 100B, 100C, 100D, 100100F, and 100G, but the card unique ID of the memory card 200 and the password which is not correspondence to the card unique ID are retained in the password retention part 101 or the IC card 300, before the insertion of the memory card 200 in which the password is set into the electronic device 100I, the display part 117 displays, e.g., the screen shown in (a) of FIG. 19. In addition, in this screen, the display of the icon is not performed.

Subsequently, the memory card 200 is inserted into the electronic device 100I, and the authentication of the memory card 200 is performed using the password retained in the password retention part 101 or the like. Thereafter, since the password retained in the password retaining part 101 or the like does not match with the password retained in the memory card 200, the unlocking is not performed, and the display part 117 displays a password authentication screen. When the unlocking is not performed even with the password inputted by the input unit 102, as shown in (b) of FIG. 19, the display part 117 displays a locking screen. In this screen, the lock icon is displayed.

With the screen displays of FIG. 19, since the locked state of the memory card 200 is not unlocked, it is possible to instantly ascertain that the password retained in the password retaining part 101 or the like is different from the password retained in the memory card 200 as in a case where, e.g., the password of the memory card 200 is changed by another electronic device.

According to such electronic device 100I, it is possible to recognize whether or not the password is set in the memory card 200 and whether or not the memory card 200 is in the locked state at a glance. Consequently, it is possible to discern, e.g., whether the memory card 200 is brought into the unlocked state simply because the password is not set or the memory card 200 is automatically brought into the unlocked state after the locked state because the password is set.

It is to be noted that the functions of the electronic devices in the first to ninth embodiments can be combined. For example, in the password setting mode and the password erasing mode, the password generated by the password generation unit 115 of FIG. 12 can be used.

INDUSTRIAL APPLICABILITY

The present invention is useful for an electronic device, a program, and the like which are capable of automatically unlocking a lock of an external storage device using a password without adding a function to the external storage device.

The invention claimed is:

1. An electronic device comprising:
    an external storage device connection part for connecting an external storage device capable of being locked by a password;
    an identification information acquisition part for acquiring identification information for identifying the external storage device;
    a password retention part retaining the identification information and the password of the external storage device in association with each other;
    a lock state determination part determining whether or not the external storage device connected to the external storage device connection part is in a locked state;
    a password generation part generating the password; and
    an unlocking part transmitting a first unlocking signal for unlocking the locked state of the external storage device on a basis of the password associated with the identification information when the lock state determination part determines that the external storage device is in the locked state and when identification information identical with the identification information acquired by the identification information acquisition part is retained in the password retention part,
    wherein the password generation part generates the password on the basis of the identification information for identifying the external storage device and identification information for identifying an IC card connected to the electronic device, and when the unlocking part fails in unlocking after the transmission of the unlocking signal, the unlocking part retransmits a second unlocking signal on the basis of a password inputted by an input part.

2. The electronic device according to claim 1, wherein, when the unlocking part succeeds in unlocking after the retransmission of the second unlocking signal, the unlocking part stores the identification information acquired by the identification information acquisition part and the password inputted by the input part in the password retention part in association with each other.

3. An electronic device, comprising:
    an external storage device connection part connecting an external storage device capable of being locked by a password;
    a password retention part retaining the password of the external storage device;
    a lock state determination part determining whether or not the external storage device connected to the external storage device connection part is in a locked state;
    a password generation part generating the password; and an unlocking part, when the lock state determination part determines that the external storage device is in the locked stated, transmitting a first unlocking signal for unlocking the locked state of the external storage device on a basis of the password retained by the password retention part, and transmitting the unlocking signal on a basis of a second password retrieved from the password retention part when the unlocking part fails in unlocking, wherein the password generation part generates the password on the basis of the identification information for identifying the external storage device and identification information for identifying an IC card connected to the electronic device, the unlocking part sequentially retrieves another password from the password retention part and transmits said another password for unlocking the locked state of the external storage device on a basis of said another password when the unlocking part fails in unlocking with the previous password.

4. The electronic device according to claim 1, further comprising:
a password setting part transmitting a password setting signal for setting the password to the external storage device.

5. The electronic device according to claim 4, wherein the password setting part transmits the password setting signal for setting the password inputted by the input part.

6. The electronic device according to claim 4, further comprising:
a password mode setting part setting a password mode for setting or erasing the password, wherein
when a password setting mode is set as the password mode, the password setting part transmits the password setting signal on the basis of the password associated with the identification information acquired by the identification information acquisition part.

7. The electronic device according to claim 6, further comprising:
a password erasing part transmitting a password erasing signal for erasing the password on the basis of the password associated with the identification information acquired by the identification information acquisition part when a password erasing mode is set as the password mode.

8. The electronic device according to claim 6, further comprising:
a main body lock mode setting part setting a main body lock mode for locking or unlocking a function provided in the electronic device, wherein
when a locking mode is set as the main body lock mode, the password mode setting part sets the password setting mode as the password mode.

9. The electronic device according to claim 8, wherein, when an unlocking mode is set as the main body lock mode, the password mode setting part sets the password erasing mode as the password mode.

10. The electronic device according to claim 4, wherein the password setting part stores the set password in the password retention part.

11. The electronic device according to claim 1, wherein the password is a password for locking or unlocking the function provided in the electronic device.

12. The electronic device according to claim 1, wherein the password is based on IC identification information for identifying an IC card connected to the electronic device.

13. The electronic device according to claim 1, further comprising:

a data access part for getting access to data of the external storage device; and
a power supply part supplying power to the external storage device during a time period when the access is performed by the data access part, wherein
when the power is supplied by the power supply part, the unlocking part transmits the unlocking signal.

14. The electronic device according to claim 1, further comprising:
an IC card connection part connecting the IC card having the password retention part, wherein when data reference or data storage is performed to the password retention part of the IC card, the unlocking part or the identification information acquisition part makes an access request to the IC card.

15. The electronic device according to claim 12, wherein the IC card is a SIM card.

16. The electronic device according to claim 1, further comprising:
a display part performing a display for reporting at least one of a password setting state in the external storage device and a lock setting state of the external storage device.

17. The electronic device according to claim 16, wherein, when the password is set in the external storage device and the external storage device is in the locked state, the display part displays that the password is set in the external storage device and the external storage device is in the locked state.

18. The electronic device according to claim 16, wherein, when the password is set in the external storage device and the external storage device is in an unlocked state, the display part displays that the password is set in the external storage device and the external storage device is in the unlocked state.

19. The electronic device according to claim 16, wherein, when the password is not set in the external storage device, the display part displays that the password is not set in the external storage device.

20. The electronic device according to claim 1, wherein the unlocking signal includes the password.

21. The electronic device according to claim 4, wherein the password setting signal includes the password.

22. The electronic device according to claim 7, wherein the password erasing signal includes the password.

23. The electronic device according to claim 6, wherein, when the password setting mode is set as the password mode, and when the identification information acquired by the identification information acquisition part is not retained in the password retention part, the password setting part transmits the password setting signal on the basis of the password inputted by the input part.

24. The electronic device according to claim 17, wherein, when the external storage device is brought into the locked state on the basis of the power supply to the external storage device, the lock state determination part determines that the password is set in the external storage device and the external storage device is in the locked state.

25. The electronic device according to claim 18, wherein, when the external storage device is brought into the locked state on the basis of the power supply to the external storage device and the unlocking of the locked state is successfully performed using the unlocking signal, the lock state determination part determines that the password is set in the external storage device and the external storage device is in the unlocked state.

26. The electronic device according to claim 19, wherein, when the external storage device is not brought into the locked state on the basis of the power supply to the external storage device, the lock state determination part determines that the password is not set in the external storage device.

27. An unlocking method comprising, in an electronic device, the steps of:

determining whether or not an external storage device is in a locked state;

generating a password in a password generation part on a basis of identification information for identifying the external storage device and identification information for identifying an IC card connected to the electronic device, transmitting a first unlocking signal for unlocking the locked state of the external storage device on a basis of the password retained in a password retention part retaining the password of the external storage device when it is determined that the external storage device connected to an external storage device connection part connecting the external storage device capable of being locked using the password is in the locked state, and when the locked state is not unlocked after the transmission of the first unlocking signal, retransmitting a second unlocking signal for unlocking the locked state of the external storage device on the basis of a password inputted by an input part.

* * * * *